United States Patent
Aihara et al.

(10) Patent No.: US 9,040,182 B2
(45) Date of Patent: May 26, 2015

(54) POWER STORAGE DEVICE CELL, MANUFACTURING METHOD THEREFOR, AND ELECTRIC STORAGE DEVICE

(75) Inventors: Shigeru Aihara, Tokyo (JP); Kenro Mitsuda, Tokyo (JP); Makiko Kise, Tokyo (JP); Daigo Takemura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 365 days.

(21) Appl. No.: 13/512,056

(22) PCT Filed: Dec. 27, 2010

(86) PCT No.: PCT/JP2010/073534
§ 371 (c)(1),
(2), (4) Date: May 25, 2012

(87) PCT Pub. No.: WO2011/092990
PCT Pub. Date: Aug. 4, 2011

(65) Prior Publication Data
US 2012/0276421 A1    Nov. 1, 2012

(30) Foreign Application Priority Data

Jan. 28, 2010   (JP) ................. 2010-016586

(51) Int. Cl.
*H01M 12/00* (2006.01)
*H01M 4/133* (2010.01)
*H01M 4/1393* (2010.01)
*H01M 4/587* (2010.01)
*H01M 4/70* (2006.01)
(Continued)

(52) U.S. Cl.
CPC .......... *H01M 4/133* (2013.01); *Y10T 29/49108* (2015.01); *H01M 4/587* (2013.01); *H01M 4/70* (2013.01); *H01M 10/0525* (2013.01); *H01M 10/0585* (2013.01); *H01M 10/4264* (2013.01); *H01M 12/005* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 5,451,477 A * | 9/1995 | Omaru et al. | 429/326 |
| 2009/0029257 A1 | 1/2009 | Ando et al. | |
| 2009/0148759 A1 | 6/2009 | Mitsuda et al. | |

FOREIGN PATENT DOCUMENTS

| | | |
|---|---|---|
| JP | 2000 58051 | 2/2000 |
| JP | 2000-294240 | 10/2000 |

(Continued)

OTHER PUBLICATIONS

U.S. Appl. No. 13/520,296, filed Jul. 2, 2012, Kise, et al.
(Continued)

*Primary Examiner* — Jonathan Crepeau
(74) *Attorney, Agent, or Firm* — Oblon, McClelland, Maier & Neustadt, L.L.P.

(57) ABSTRACT

A power storage device cell is configured to include a capacitor positive electrode, a lithium positive electrode, and a common negative electrode in which electrode layers are formed on a collector foil in which penetration holes are formed, and such that the capacitor positive electrode and the lithium positive electrode are directly connected; each of the electrode layers of the common negative electrode is formed of a carbon-based material in which graphite particles and hard carbon particles are mixed, and the proportion of the hard carbon particles in the carbon-based material is from 5% by weight to 70% by weight.

12 Claims, 6 Drawing Sheets

(51) Int. Cl.
*H01M 10/0525* (2010.01)
*H01M 10/0585* (2010.01)
*H01M 10/42* (2006.01)

(56) References Cited

FOREIGN PATENT DOCUMENTS

| JP | 2000 294240 | 10/2000 |
|---|---|---|
| JP | 2001 351688 | 12/2001 |
| JP | 2002 118036 | 4/2002 |
| JP | 2008-235169 | 10/2008 |
| JP | 2008 235169 | 10/2008 |
| JP | 2009 26480 | 2/2009 |
| JP | 2009-026480 | 2/2009 |
| JP | 2009 141181 | 6/2009 |
| JP | 2009-141181 | 6/2009 |
| WO | 2011 093126 | 8/2011 |

OTHER PUBLICATIONS

International Search Report issued Mar. 22, 2011 in PCT/JP10/73534 Filed Dec. 27. 2010.
Office Action issued on Jul. 2, 2013 in the corresponding Japanese Patent Application No. 2011-551716 (with English Translation).

* cited by examiner

POWER STORAGE DEVICE CELL, MANUFACTURING METHOD THEREFOR, AND ELECTRIC STORAGE DEVICE

TECHNICAL FIELD

The present invention relates to the configuration of a power storage device cell incorporating a composition of a lithium ion capacitor and a composition of a lithium ion battery, the manufacturing method therefor, and an electric storage device.

BACKGROUND ART

A capacitor that physically stores an electric charge and a secondary battery that stores energy through electrochemical reaction are among power storage device cells. A capacitor is characterized in that although its energy density is low, its output density is high and hence it can respond to rapid charging or discharging; a secondary battery is characterized in that although its instantaneous force is inferior to that of a capacitor, its energy density is high and hence its sustainability is superior to that of a capacitor. Accordingly, if there can be realized a power storage device cell that is provided with both the instantaneous force of a capacitor and the sustainability of a secondary battery, it can be utilized in various applications such as a hybrid automobile and various kinds of regenerative brakes.

As described above, a capacitor and a secondary battery are different from each other in terms of the mechanism for storing electric power; among capacitors, a capacitor utilizing an electrolyte (referred to as an electric double layer capacitor, a super capacitor, an electrochemical capacitor, or the like; a lithium ion capacitor is also among those capacitors) is provided with polarizable electrodes (a positive electrode and negative electrode) facing each other across a separator, stores electric charges by utilizing an electrostatic capacitance of electric double layers, which are formed on the surfaces of the polarizable electrodes in the electrolyte, and is formed of materials similar to those of a secondary battery.

Thus, the inventors of the present invention paid attention to a lithium ion battery, among secondary batteries, that has an especially high energy density, and proposed a new power storage device cell in which a lithium ion battery and a lithium ion capacitor, which works by sharing common electrolyte with the lithium ion battery, are configured into a single structure by use of a common negative electrode (e.g., refer to Patent Document 1).

PRIOR ART REFERENCE

Patent Document

[Patent Document 1] Japanese Patent Application Laid-Open No. 2009-141181 (Paragraphs 0015 and 0068, FIGS. 1 and 12)

DISCLOSURE OF THE INVENTION

Problem(s) to be Solved by the Invention

By means of the foregoing structure, a power storage device cell could be realized which has both the instantaneous force of an electric double layer capacitor and the sustainability of a lithium ion battery. However, it has been learned that there is a problem that when rapid charging and discharging are repeated in a power storage device cell having the foregoing structure, the electrostatic capacitance decreases faster, which does not occur in the case where only a capacitor is included, and hence the reliability is deteriorated.

The present invention has been implemented in order to solve the foregoing problem; the objective thereof is to provide a high-reliability power storage device cell that has both the instantaneous force and the sustainability and can maintain the electrostatic capacitance thereof even when rapid charging and discharging are repeated.

Means for Solving the Problems

A power storage device cell according to the present invention includes a first electrode in which a first electrode layer including activated-carbon fine particles is formed on one side of a first collector foil; a second electrode in which a second electrode layer including lithium-containing metal compound particles is formed on one side of a second collector foil; a third electrode in which a third electrode layer is formed on at least one side of a third collector foil; a first separator formed of a porous insulative film; and a second separator formed of a porous insulative film. The power storage device cell is characterized in that penetration holes are formed in the third collector foil, that a capacitor whose negative electrode is the third electrode is formed by inserting the first separator between the first electrode layer and one side of the third electrode, that a lithium ion battery whose negative electrode common to the capacitor is the third electrode is formed by inserting the second separator between the second electrode layer and the other side of the third electrode, that the first electrode and the second electrode are directly connected, and that the third electrode layer is formed of a carbon-based material in which graphite particles and hard carbon particles are mixed, and the proportion of the hard carbon particles in the carbon-based material is from 5% by weight to 70% by weight.

Advantage of the Invention

It was found that concentrated formation of lithium dendrites in the vicinity of the penetration holes in the collector foil of the common negative electrode causes a decrease in the electrostatic capacitance, and hence, as the countermeasures therefor, the power storage device cell was configured in such a way that the hard carbon particles are mixed in the carbon-based material of the common negative electrode; therefore, the concentrated formation of lithium dendrites is suppressed, and the electrostatic capacitance can be maintained even in the case where rapid charging and discharging are repeated. As a result, a high-reliability power storage device cell can be obtained which has both the instantaneous force and the sustainability and can maintain the electrostatic capacitance thereof even when rapid charging and discharging are repeated.

BEST MODE FOR CARRYING OUT THE INVENTION

Embodiment 1

Basic Structure of Power Storage Device Cell

Figure 1:
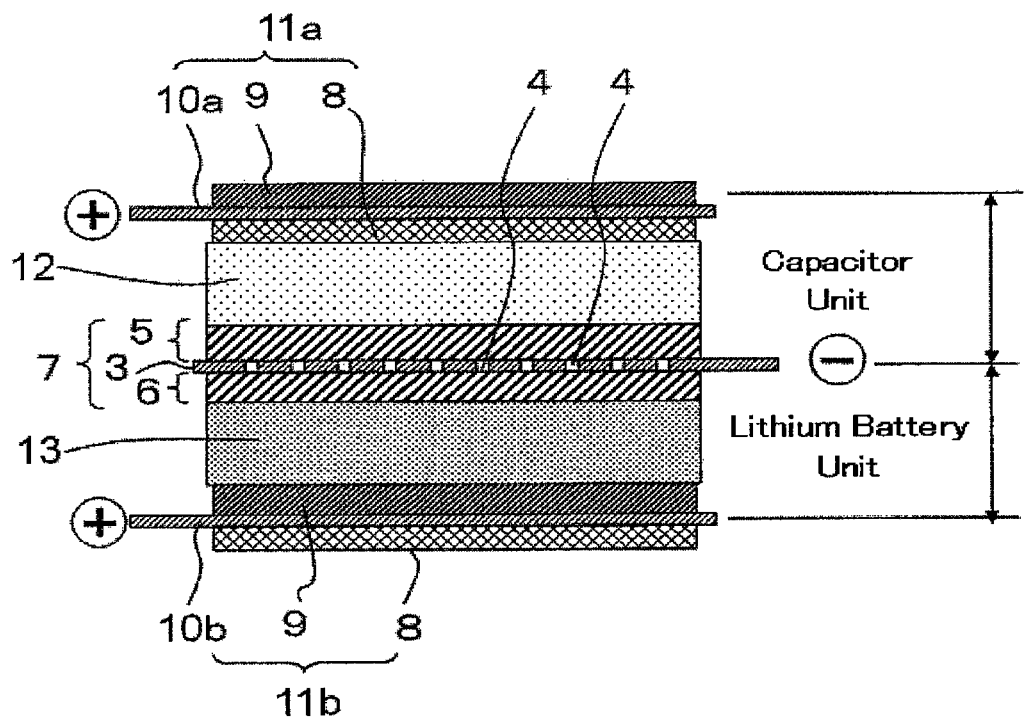
FIG. 1 is a partial cross-sectional view schematically illustrating a power storage device cell according to Embodiment 1 of the present invention.

FIG. 1 is a cross-sectional view illustrating the partial configuration of a power storage device cell according to Embodiment 1 of the present invention. In FIG. 1, the power storage device cell is provided with a capacitor positive electrode 11a in which a capacitor positive electrode layer 8 including activated-carbon fine particles is formed beneath a collector foil 10a in FIG. 1, a lithium positive electrode 11b in which a lithium positive electrode layer 9 including particles of lithium-containing metal compounds is formed over a collector foil 10b in FIG. 1, a common negative electrode 7 in which a capacitor negative electrode layer 5 is formed over the upper side of a collector foil 3 having penetration holes 4 and a lithium negative electrode layer 6 is formed beneath the lower side of the collector foil 3, a first separator 12 formed of a porous insulative film, and a second separator 13 formed of a porous insulative film; a capacitor unit is formed by inserting the first separator 12 between the capacitor positive electrode layer 8 and the capacitor negative electrode layer 5 of the common negative electrode 7, and a lithium battery unit is formed by inserting the second separator 13 between the lithium positive electrode layer 9 and the lithium negative electrode layer 6 of the common negative electrode 7; the capacitor positive electrode 11a and the lithium battery positive electrode 11b are directly connected with each other. As a specific configuration for preventing a decrease of electrostatic capacitance as described above, the carbon material that forms the electrode layers 5 and 6 of the common negative electrode 7 is made by mixing graphite particles and hard carbon particles, and the ratio of the hard carbon particles to the carbon-based materials is made to be from 5% to 70% by weight.

In the power storage device cell configured as described above, the common negative electrode 7 is commonly utilized by the capacitor unit and the lithium battery unit, as the negative electrodes thereof, and the capacitor positive electrode 11a and the lithium positive electrode 11b are directly connected with each other. Accordingly, when charging and discharging are implemented, lithium ions can rapidly move between the capacitor unit and the lithium battery unit, through the penetration holes 4 provided in the common negative electrode 7; thus, the capacitor unit can also participate in the charging and discharging, whereby rapid charging and discharging can be realized.

<Discovery of Cause of Decrease in Electrostatic Capacitance>

In this situation, when as explained in "Background Art", the common negative electrode of the power storage cell device, which is a hybrid structure of the capacitor and the lithium battery, was formed, as ever before, of a carbon material consisting of only graphite particles, there was caused a phenomenon that when rapid charging and discharging are implemented, the electrostatic capacitance decreases. When the device, the electrostatic capacitance of which had decreased, was decomposed to be examined, it was learned that lithium dendrites had formed in the common negative electrode. The formation of the lithium dendrites is a known phenomenon that occurs also in the case of a normal lithium ion capacitor; however, because forming on the overall electrode surface, dendrites that form at a time when a lithium ion capacitor is not combined with a lithium battery cause neither a short circuit nor a decrease in the electrostatic capacitance. In contrast, lithium dendrites formation during rapid charging and discharging are repeated in a power storage cell device having a hybrid structure including a capacitor and a lithium battery, comes in a concentrated manner in the vicinity of penetration holes in the common-negative-electrode collector foil provided for realizing the hybrid structure. It was learned that due to this concentrated formation, lithium dendrites largely grow toward the separator and intrude into the separator, thereby decreasing the electrostatic capacitance maintenance rate extremely. It was also learned that when the lithium dendrites further grow to reach the opposite electrode, a minute short circuit arises and hence internal short-circuiting may occur.

Then, it was learned that the reason why lithium dendrites form in a concentrated manner in the vicinity of the penetration holes is that lithium charging reaction occurs in a concentrated manner in the vicinity of the peripheral portions of the penetration holes. Thus, in the present invention, a common negative electrode configured as described above is utilized so as to suppress charging reaction from occurring in a concentrated manner in the vicinity of the penetration holes. The detail will be explained below.

<Configuration for Hybrid Structure>

In FIG. 1, the common negative electrode 7 is configured by coating, with the mixture of graphite particles and hard carbon particles, the upper side and the lower side of the negative electrode collector foil 3, in which a plurality of penetration holes that distribute in-plane are provided, so as to form the capacitor negative electrode layer 5 and the lithium battery negative electrode layer 6. The positive electrode is configured as a hybrid positive electrode 11 in which the capacitor positive electrode layer 8 including activated-carbon particles and the lithium battery positive electrode layer 9 including lithium-containing metal compound particles are formed on the lower side and the upper side, respectively, of a positive electrode collector foil 10. The capacitor unit is configured by inserting the first separator between the capacitor positive electrode layer 8 and the capacitor negative electrode layer 5; the lithium battery unit is configured by inserting the second separator 13 between the lithium ion battery positive electrode layer 9 and the lithium battery negative electrode layer 6. In other words, in FIG. 1, the hybrid positive electrodes 11 having the same specification, in which the capacitor positive electrode layer 8 is formed on the one side of the collector foil 10 and the lithium battery positive electrode layer 9 is formed on the other side thereof, play different roles by being differently disposed (due to the difference in the side to be utilized), i.e., the hybrid positive electrodes 11a and 11b function as the capacitor positive electrode and the lithium battery positive electrode, respectively.

The capacitor positive electrode in which the capacitor positive electrode layer 8 is provided on the one side of (beneath) the strip-shaped positive electrode collector foil 10a, the first separator 12, the common negative electrode 7, the second separator 13, and the lithium battery positive electrode in which the lithium battery positive electrode layer is provided on the other side of (over) the positive electrode collector foil 10b are laminated on that order, and then the capacitor positive electrode and the lithium battery positive electrode are directly connected, so that a power storage device cell having a simplest laminate shape can be configured.

The strip-shaped common negative electrode 7, the first separator 12, the hybrid positive electrode 11, and the second separator 13 are alternately laminated so that a so-called laminate-type electric storage device is configured which has a main laminate unit in which a great number of positive electrodes and negative electrodes are laminated in parallel with one another. In the case of a parallel laminate type, it is desirable to arrange the common negative electrodes 7 at both outmost layers. In the case where the hybrid positive electrode 11 is disposed at the outmost layer, the capacitor positive electrode layer 8 or the lithium battery positive electrode layer 9 may have a high electric potential and hence be deteriorated. Moreover, in the case of a parallel laminate type, as both outmost layers, a capacitor negative electrode in which the capacitor negative electrode layer 5 is provided on one side of a strip-shaped negative electrode collector foil and a lithium battery negative electrode in which the lithium battery negative electrode layer 6 is provided on one side of a negative electrode collector foil can be utilized. In this case, a negative electrode collector foil having no penetration hole may be utilized. Alternatively, as both outmost layers, a capacitor positive electrode in which the capacitor positive electrode layer 8 is provided on one side of a strip-shaped positive electrode collector foil and a lithium battery positive electrode in which the lithium battery positive electrode layer 9 is provided on one side of a positive electrode collector foil can be utilized.

A winding-type or flat-winding-type electric storage device is configured by winding a roll-shaped common negative electrode 7, the first separator 12, the hybrid positive electrode 11, and the second separator 13 together. In this case, it is desirable to dispose at the outmost layer the first separator 12 in contact with the common negative electrode 7. When the second separator 13 in contact with the hybrid positive electrode 11 is disposed at the outmost layer, the capacitor positive electrode layer 8 or the lithium battery positive electrode layer 9 may have a high electric potential and hence be deteriorated.

<Common Negative Electrode>

As the materials for the capacitor negative electrode layer 5 and the lithium battery negative electrode layer 6 which are utilized in the common negative electrode 7, a mixture of hard-carbon-based particles that are utilized in conventional lithium ion batteries and can perform lithium-ion absorption and desorption at a high electric potential, and graphite-based particles that can perform lithium-ion absorption and desorption at a low electric potential can be utilized. It is desirable to set the average particle diameter to be approximately 1 to 20 μm, respectively.

As a hard-carbon-based particle, a carbon particle obtained by applying heat treatment to non-crystalline carbon, amorphous carbon, or graphitizable carbon at a relatively low temperature of approximately 1000° C. to 1500° C. can be utilized. The nature common to these particles is that they can perform lithium-ion absorption and desorption at a high electric potential of 1.0 V (vs. Li) and the electric potential thereof gradually drops.

As a graphite-based particle, there can be utilized natural graphite such as Sri Lanka-produced graphite, Madagascar-produced graphite or China-produced graphite, artificial graphite such as mesocarbon microbead graphite, coke-based graphite, or flake graphite, expanded graphite in which the gap between layers is expanded, or the like. The nature common to these graphite types is that they can perform absorption and desorption of a great deal of lithium ions at a low electric potential close to the oxidation-reduction potential of lithium but can hardly perform lithium-ion absorption and desorption at an electric potential of 0.3 V (vs. Li) or higher.

Figure 2:
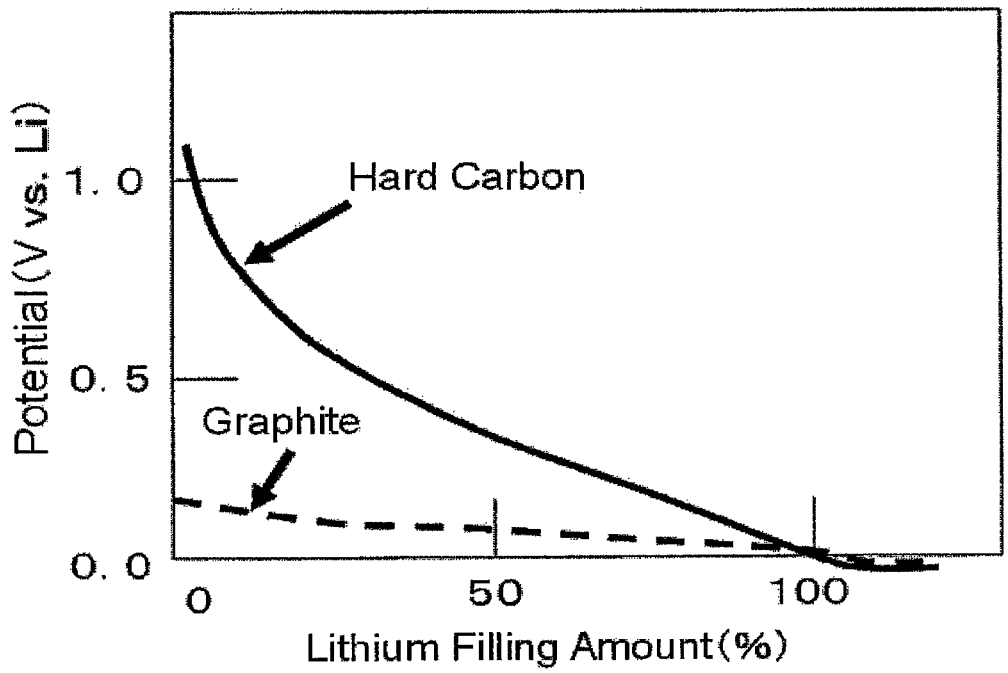
FIG. 2 is a graph representing the respective charging potentials of hard carbon and graphite vs. the lithium filling amount.

Next, the electrochemical nature of a carbon particle utilized in the common negative electrode will be explained. FIG. 2 represents, with regard to two kinds of carbon materials utilized in the common negative electrode, the relationship between the lithium filling amount and the carbon negative electrode potential vs. the lithium reference potential at a time when lithium dendrites form, assuming that the lithium filling amount (capacity) at a time when the respective potentials of the carbon materials vs. lithium reference potential are 0 V is 100%. In FIG. 2, when the lithium filling amount exceeds the filling amount corresponding to a given potential, lithium is deposited, i.e., dendrite forms. In the case where only hard-carbon-based particles are utilized, although varying depending on a material, the absorption of lithium ions starts from a high potential of approximately 1 V; as the ratio of absorbed lithium ions rises, the potential drops and then reaches 0 V at the ratio becomes close to 100%. In contrast, in the case where only graphite-based particles are utilized, although varying to some extent depending on a material, lithium is never absorbed until the potential drops to approximately 0.1 V; when the potential becomes lower than 0.1 V, a great deal of lithium ions can be absorbed.

Figure 3:
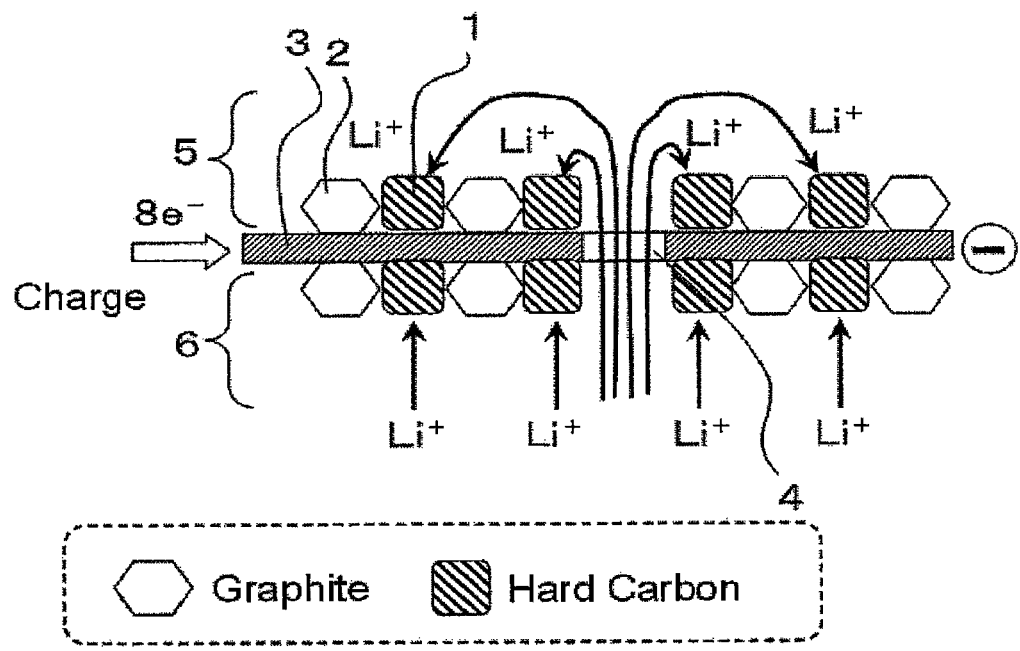
FIG. 3 is an enlarged cross-sectional view schematically illustrating the behavior, during charging, of a lithium ion in the vicinity of a penetration hole in a common-negativeelectrode collector foil in a power storage device cell according to Embodiment 1 of the present invention.

FIG. 3 is an enlarged cross-sectional view schematically illustrating a charging behavior when the common negative electrode 7 is formed of the electrode layers 5 and 6 in each of which hard carbon particles 1 and graphite particles 2 are alternatively arranged on both sides of the collector foil 3 made of a copper punching metal. A lithium ion can move between the capacitor unit and the lithium battery unit through the penetration hole 4 of the negative electrode collector foil 3; therefore, when charging is performed, the carbon can be charged with a lithium ion that moves into the capacitor negative electrode layer 5 of the capacitor unit. This is a great advantage of the common negative electrode. That is to say, not only the lithium ion negative electrode layer 6 but also the capacitor negative electrode layer 5 can participate in charging and discharging. Thus, polarization in the negative electrode can largely be reduced, whereby the charging/discharging efficiency can be raised. Moreover, the output density can largely be improved.

In the case where the electrode layers of the common negative electrode are formed of only the graphite particles 2 as ever before and rapid charging and discharging are repeated, lithium dendrites are deposited preferentially on the carbon particles disposed in the vicinity of the penetration holes 4; therefore, the deposited dendrites may penetrate the separator, thereby causing short-circuiting between the negative electrode and the positive electrode. The reason why the short-circuiting is caused is that when the charging of the vicinity of the penetration hole 4 starts, the electrochemical potential of the vicinity of the penetration hole 4 drops and hence lithium ions can more easily be absorbed. In other words, when the electrochemical potential does not become uniform on a plane, a local low potential is caused.

However, in a power storage device cell according to Embodiment 1 of the present invention, as illustrated in FIG. 3, at the initial time of charging, a lithium ion is absorbed preferentially by the hard carbon particle 1 among the carbon-based particles in the electrode layers; thus, the electrochemical potential can be maintained constant throughout the entire area of the capacitor negative electrode layer 5 and the lithium battery negative electrode layer 6. As the amount of absorbed lithium ions increases, the electrochemical potential gradually drops, and in the case when the electrochemical potential drops to 0.1 V (vs. Li), a lithium ion is absorbed by the graphite particle 2 in the vicinity of the hard carbon particle 1, whereby a great deal of lithium ions can be absorbed.

Figure 4:
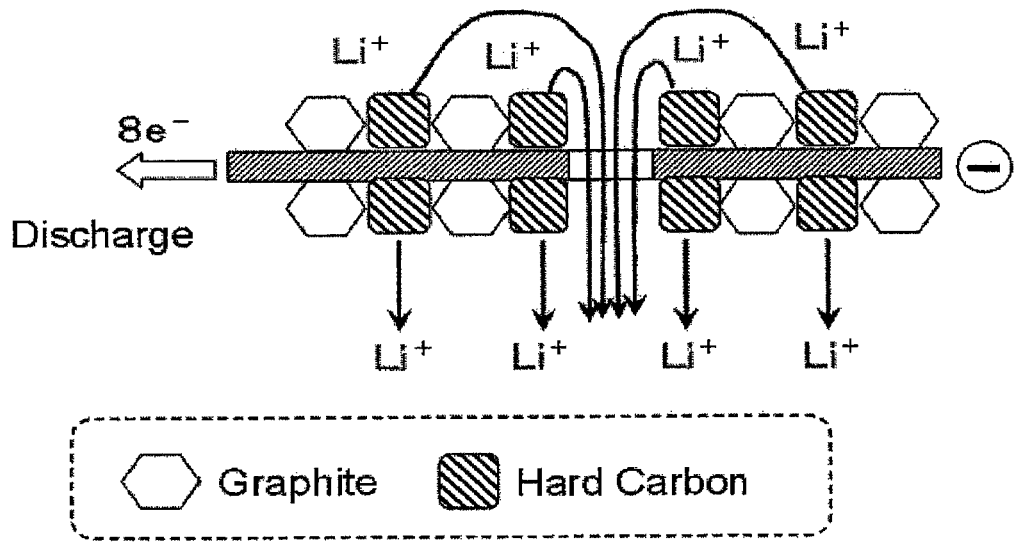
FIG. 4 is an enlarged cross-sectional view schematically illustrating the behavior, during discharging, of a lithium ion in the vicinity of a penetration hole in a common-negative-electrode collector foil in a power storage device cell according to Embodiment 1 of the present invention.

FIG. 4 illustrates a discharging behavior in the same portion as that illustrated in FIG. 3; contrary to the charging instance, desorption of a lithium ion from the graphite particle 2 is started; because a lithium ion that has been absorbed by the hard carbon particle 1 is kept as it is, the electrochemical potential can be maintained constant throughout the entire area of the capacitor negative electrode layer 5 and the lithium battery negative electrode layer 6. As the amount of desorbed lithium ions increases, the electrochemical potential gradually rises, and in the case when the electrochemical potential exceeds 0.2 V (vs. Li), desorption of a lithium ion from the hard carbon particle 1 is started, and then the desorption of lithium ions continues until the electrochemical potential comes up to 1.0 V (vs. Li); during the desorption, the electrochemical potential can be maintained constant throughout the entire area of the capacitor negative electrode layer 5 and the lithium battery negative electrode layer 6.

The hard carbon particle 1 is added for the purpose that the electrochemical potential can be maintained constant throughout the entire area of the capacitor negative electrode layer 5 and the lithium battery negative electrode layer 6; thus, the required amount of the hard carbon particles 1 is small. When the amount of the added hard carbon particles 1 is as large as 5% of the total weight (total carbon-based particle materials) of the hard carbon particles 1 and the graphite particles 2, the effect can be demonstrated. When the weight ratio of the added hard carbon particles 1 is smaller than 5%, the effect of keeping the electrochemical potential throughout the entire area of the electrode layers uniform is diminished, whereby the effect of suppressing lithium dendrites from forming in the vicinity of the penetration holes 4 is nullified. When the weight ratio of the added hard carbon particles 1 exceeds 70%, the number of hard carbons 1 in the vicinity of the penetration holes 4 increases, whereby lithium dendrites may eventually form in the vicinity of the through-holes 4. Therefore, it is desirable that the weight ratio of added hard carbon particles 1 is the same as or larger than 5% but smaller than 70%. In contrast, the distribution of the particle diameters of carbon-based particle materials varies. Accordingly, in the case where when an electrode layer is formed, the ratio of the hard carbon particles 1 is smaller than 20% or larger than 40%, it is required to select the hard carbon particle 1 of the particle diameters of narrow range in the particle diameters distribution to utilize, whereby the material yield becomes lower. When in order to cope with this, the ratio of the hard carbon particles 1 is set to a value between 20% and 40%, the electrode layer can be formed without making selection based on the particle diameter; thus, even the material yield can be boost.

In the foregoing example, the common electrode materials are utilized in the electrode layers 5 and 6 without any distinction. The respective weight ratios of the hard carbon particles 1 may differ between the capacitor negative electrode layer 5 and the lithium battery negative electrode layer 6. In particular, by disposing a great number of the hard carbon particles 1 on the capacitor negative electrode layer 5, a lithium dendrite can be suppressed from forming in the vicinity of the penetration hole 4 of the capacitor negative electrode layer 5.

As the negative electrode collector foil 3, there may be utilized a punching metal copper foil or an expanded metal copper foil, in which the penetration holes 4 are preliminarily formed so as to distributed in-plane thereof and the thickness of which is from 10 μm to 20 μm, or an etching foil in which, by use of a mask, a great number of holes are formed through chemical etching. Such a negative electrode collector foil can be utilized with the capacitor negative electrode layer 5 and the lithium battery negative electrode layer 6 formed on the respective sides thereof. As the positive electrode collector foil 10, an aluminum foil having a thickness of from 7 μm to 50 μm can be utilized.

<Other Constituent Materials>

As the electrolyte solution, for example, an electrolyte solution obtained by making $LiPF_6$, which is an electrolyte, to be contained in an organic solvent can be utilized; the electrolyte solution is shared in both the capacitor unit and the lithium battery unit. As the organic solvent, for example, a propylene carbonate (PC), an ethylene carbonate (EC), a diethyl carbonate (DEC), or the like can be utilized.

As each of the first separator 12 and the second separator 13, for example, there can be utilized an insulative film made of cellulose, polyethylene, or polypropylene having a thickness of approximately 10 to 50 μm, a pore rate (porosity) of approximately 60% to 80% by volume, and an average pore diameter of approximately several to several dozen micrometers.

It is desirable to utilize, as the activated-carbon particle for the capacitor positive electrode layer 8, a particle that has an average particle diameter of approximately to 10 μm and is obtained by applying steam activation or alkali activation to phenol resin, petroleum pitch, petroleum coke, palm coke, or the like.

As the lithium-containing metal compound particle for the lithium battery positive electrode layer 9, lithium cobalt oxide ($LiCoO_2$) is desirable because its heat absorption amount during a charging period and its heat generation amount during a discharging period are large; in addition to that, as a particle that absorbs heat during a charging period and generates heat during a discharging period, there may be utilized a lithium cobalt oxide containing olivine-type lithium iron phosphate, lithium nickel oxide (LiNiO$_2$), or lithium manganese oxide (LiMn$_2$O$_4$), or there may be utilized a multinary compound such as a ternary compound or a quarternary compound. It is desirable to utilize a particle having an average particle diameter of approximately 1 to 10 μm. In particular, in the case where olivine-type ion phosphate is utilized, the withstand voltage of the capacitor is higher than that of the battery; thus, the load on the capacitor can be increased when rapid charging is performed, whereby a power storage device having a larger instantaneousness can be realized.

Next, in order to verify the performance of a power storage device cell according to Embodiment 1 of the present invention, prototype cells having different structures of the common negative electrode were manufactured and performance tests were carried out. In the foregoing performance tests, in order to simplify the test condition, a positive electrode dedicated to a lithium battery positive electrode and a positive electrode dedicated to a capacitor positive electrode were utilized instead of hybrid electrodes.

Example 1

Manufacturing of Common Negative Electrode

As the negative electrode layers 5 and 6, 5 units of hard carbon particles having an average particle diameter of 7 μm and units of graphite particles having an average particle diameter of 5 μm were mixed (the addition amount of the hard carbon is 5% by weight), and then an electrode paste consisting of polyvinylidene fluoride, as a binder, and n-methylpyrrolidone, as a solvent, was mixture-prepared. Next, both sides of a copper foil, as the negative electrode collector foil 3, the width and the thickness of which are 300 mm and 20 μm, respectively, and in which holes (penetration holes 4) having a diameter of 1 mm have been punched in steps of 5 mm, were coated with this paste and dried; then, the copper foil was hot-pressed at 150° C. to be adopted as the common negative electrode. The negative electrode was cut into a strip of 32 mm by 52 mm; a portion of 20 mm by 20 mm was cut out from the corner thereof; then, a tab of 7 mm by 20 mm was provided so as to be utilized as a current terminal tab.

[Manufacturing of Capacitor Positive Electrode]

As the capacitor positive electrode layer, an electrode paste consisting of activated-carbon having an average particle diameter of 5 μm, acrylic-based polymer, as a binder, and water, as a solvent, was mixture-prepared. Next, one side of a pure-aluminum collector foil 10C having a thickness of 50 μm and a width of 300 mm was coated with this paste so that the capacitor positive electrode layer 8 having a thickness of 100 μm was formed; then, a capacitor positive electrode 11C was obtained. The positive electrode 11C was cut into a strip of 30 mm by 50 mm; a portion of 23 mm by 20 mm was cut out from the corner thereof; then, a tab of 7 mm by 20 mm was provided, and then the capacitor positive electrode layer 8 corresponding to the tab was peeled off, so that the foil portion was exposed so as to be utilized as a current terminal tab.

[Manufacturing of Lithium Battery Positive Electrode]

As the lithium battery positive electrode layer, olivine-type lithium iron phosphate having an average particle diameter 5 μm, acetylene black, polyvinylidene fluoride (PVDF), as a binder, being dispersed into n-methylpyrrolidone (NMP); were coated on the lower side of a pure-aluminum collector foil 10L having a thickness of 50 μm, and dried at 100° C. so as to form the lithium battery positive electrode layer 9 having a thickness of 100 μm; then, the lithium battery positive electrode layer 9 was pressed with a hot roll at 150° C. so that a lithium battery positive electrode 11L was obtained. The positive electrode 11L was cut into a strip of 30 mm by 50 mm; a portion of 23 mm by 20 mm was cut out from the corner thereof; then, a tab of 7 mm by 20 mm was provided, and then the lithium battery positive electrode layer 9 corresponding to the tab was peeled off, so that the foil portion was exposed so as to be utilized as a current terminal tab.

[Manufacturing of Cell]

Figure 5:
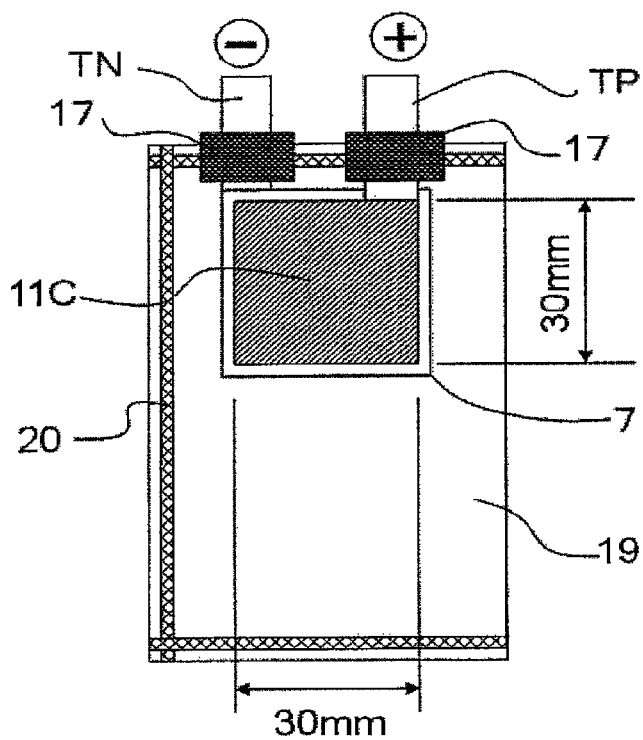
FIG. 5 is a plan view illustrating a performance testing cell for a power storage device according to Embodiment 1 of the present invention.

The capacitor positive electrode 11C (only one side, i.e., only the electrode layer 8 is formed), the common negative electrode 7, and the lithium battery positive electrode 11L (only one side, i.e., only the electrode layer 9 is formed) were laminated in that order in such a way that the centers thereof are aligned with one another and the electrode layers thereof face one another; respective cellulose-based separators having a thickness of 35 μm were inserted between the corresponding electrode layers. The collector tabs of two positive electrodes 11C and 11L were superimposed on each other, and then these collector tabs were directly connected by an aluminum foil ultrasonic-welded thereon, so that a positive electrode collector terminal TP was formed. As illustrated in FIG. 5, this electrode laminated body is contained in an aluminum-laminate-film case 19; as the electrolyte solution, a mixed solvent of ethylene carbonate and diethyl carbonate (3:7) including LiPF$_6$ of 1.8 mol/l was put into the package; at last, the aluminum-laminate case 19 was sealed, so that a testing cell was obtained. FIG. 5 is a semi-transparent view of the testing cell to which the aluminum-laminate-film case was applied. In FIG. 5, the aluminum-laminate-film case 19 is folded half, and heat fusing 20 with thermoplastic resin is applied to the three sides thereof. Thermoplastic resins 17 having improved adhesiveness to metal are mounted on the current terminals TP and TN and then are heat-fused with the case. Through vacuum drawing, the bottom side in FIG. 5 was impregnated with the electrolyte solution; finally, heat fusing was applied to the bottom side so as to seal it. The reason why in FIG. 5, the case 19 is made longer than the electrode is that even in the case where when a contact pressure is applied to the electrode of 3 cm by 3 cm and a charging/discharging test is implemented, the electrode generates gas due to deterioration thereof, the generated gas is stored in the elongated case portion so that the test can be continued. In order to prevent a deviation between the positive electrode and the negative electrode from causing a measurement error, the exterior four sides of the negative electrode 7 are longer than the respective four sides of the positive electrodes 11C and 11L.

[Evaluation of Cell]

While by use of a stainless-steel retaining plate, a contact pressure of 5 Kg/cm$^2$ was applied to the electrode of 3 cm by 3 cm in the cell, a charging/discharging test was implemented in which 6-minute charging and 6-minute discharging (10C)

were alternatively repeated for 48 hours under the conditions of the ambient temperature of 60° C., the lower limit voltage of 1.5 V, and the upper limit voltage of 4.3 V. Before and after the test, charging and discharging were repeated three times, and then the electrostatic capacitance was determined from the discharging curve of the third charging and discharging. Defining the initial electrostatic capacitance as 100%, the post-testing electrostatic capacitance maintenance rate was determined. After the test, charging up to 4.2 V was implemented and then the voltage maintenance was examined; with regard to a cell whose voltage considerably dropped in a short time, it was determined that due to formation of a lithium dendrite, a minute short circuit arose therein. The reason why the ambient temperature was set not to the room temperature but to 60° C. and the upper limit voltage was raise up to 4.2 V is to accelerate the formation of a lithium dendrite. Moreover, the concentration of lithium salt was raised compared with the normal value (1.2 mol/l) so that an environment was made in which a lithium dendrite forms readily.

Example 2

Example 2 is the same as Example 1 except that the addition amounts of the hard carbons 1 for the capacitor negative electrode layer 5 and the lithium negative electrode layer 6 are set to 10% by weight.

Example 3

Example 3 is the same as Example 1 except that the addition amounts of the hard carbons 1 for the capacitor negative electrode layer 5 and the lithium negative electrode layer 6 are set to 30% by weight.

Example 4

Example 4 is the same as Example 1 except that the addition amounts of the hard carbons 1 for the capacitor negative electrode layer 5 and the lithium negative electrode layer 6 are set to 50% by weight.

Example 5

Example 5 is the same as Example 1 except that the addition amounts of the hard carbons 1 for the capacitor negative electrode layer 5 and the lithium negative electrode layer 6 are set to 70% by weight.

Example 6

Example 6 is the same as Example 1 except that the addition amounts of the hard carbons 1 for the capacitor negative electrode layer 5 is set to 30% by weight and the addition amounts of the hard carbons 1 for the lithium negative electrode layer 6 is set to 10% by weight.

Comparative Example 1

Comparative Example 1 is the same as Example 1 except that the capacitor negative electrode layer 5 and the lithium negative electrode layer 6 are manufactured by use of only the graphite particle 2 (without adding the hard carbon particle 1).

Comparative Example 2

Comparative Example 2 is the same as Example 1 except that the capacitor negative electrode layer 5 and the lithium negative electrode layer 6 are manufactured by use of only the hard carbon 1 (without utilizing the graphite particle 2).

Comparative Example 3

Comparative Example 3 is the same as Example 1 except that the capacitor negative electrode layer 5 is manufactured by use of only the hard carbon 1 (without utilizing the graphite particle 2) and the lithium negative electrode layer 6 is manufactured by use of only the graphite particle 2 (without adding the hard carbon particle 1).

Comparative Example 4

Comparative Example 4 is the same as Example 1 except that the capacitor negative electrode layer 5 is manufactured by use of only the graphite particle 2 (without adding the hard carbon 1) and the lithium negative electrode layer 6 is manufactured by use of only the hard carbon particle 1 (without utilizing the graphite particle 2).

The results of evaluations on Examples 1 through 6 and Comparative Examples 1 through 4 are represented in Table 1.

TABLE 1

|  | Capacitor Negative Electrode Layer | | Lithium Negative Electrode Layer | | Electrostatic Capacitance | |
| --- | --- | --- | --- | --- | --- | --- |
|  | Hard Carbon | Graphite | Hard Carbon | Graphite | Maintenance Rate | Short Circuit |
| Example 1 | 5 wt % | 95 wt % | 5 wt % | 95 wt % | 81% | None |
| Example 2 | 10 wt % | 90 wt % | 10 wt % | 90 wt % | 83% | None |
| Example 3 | 30 wt % | 70 wt % | 30 wt % | 70 wt % | 89% | None |
| Example 4 | 50 wt % | 50 wt % | 50 wt % | 50 wt % | 85% | None |
| Example 5 | 70 wt % | 30 wt % | 70 wt % | 30 wt % | 79% | None |
| Example 6 | 30 wt % | 70 wt % | 10 wt % | 90 wt % | 85% | None |
| Comparative Example 1 | 0 wt % | 100 wt % | 0 wt % | 100 wt % | 51% | Arise |
| Comparative Example 2 | 100 wt % | 0 wt % | 100 wt % | 0 wt % | 68% | None |
| Comparative Example 3 | 100 wt % | 0 wt % | 0 wt % | 100 wt % | 55% | Minute |
| Comparative Example 4 | 0 wt % | 100 wt % | 100 wt % | 0 wt % | 48% | Arise |

In Table 1, from comparison between Examples and Comparative Examples, it was learned that no short circuit arose in any one of Examples, but formation of a lithium dendrite caused a minute short circuit between the positive electrode and the negative electrode in each of Comparative Examples 1, 3, and 4. In each of Examples 1 through 6, the electrostatic capacitance maintenance ratio was a high value of 79% through 89% of the initial value; however, in each of Comparative Example 1 through 4, the electrostatic capacitance maintenance rate was a low value of 48% through 68%. In Comparative Example 2, although no minute short circuit arose, the electrostatic capacitance maintenance rate largely decreased. It is conceivable that the decrease in the electrostatic capacitance maintenance rate is the sign of formation of a lithium dendrite.

In Table 1, from comparison between Example 6 and Comparative Example 3, it was learned that in Comparative Example 3, although the cell was configured in such a way that the hard carbon particle 1 is utilized in the capacitor negative electrode layer 5 and the graphite particle 2 is utilized in the lithium battery negative electrode layer 6 so that lithium ions are absorbed preferentially by the capacitor negative electrode layer 5, formation of a lithium dendrite caused a minute short circuit. This is because that as lithium ions were absorbed by the capacitor negative electrode layer 5, a large deviation of electrochemical potential between the upper and lower sides thereof was caused thereby readily formation of lithium dendrites in the vicinity of the penetration holes 4. In contrast, it is conceivable that in Example 6, because the hard carbon 1 exists also in the lithium battery negative electrode layer 6, the electrochemical potentials of the upper and lower sides thereof are kept evenly.

With regard to foregoing Examples and Comparative Examples, a case was described in which because of the test utilizing a small cell, the dedicated capacitor positive electrode 11C and lithium battery positive electrode 11L were formed by providing the positive electrode on one side of respective positive electrode collector foils; however, it is obvious that the same effect can be obtained also with a configuration in which as illustrated in FIG. 1, alternate lamination is made through the separators, by use of the hybrid positive electrode 11 including the positive electrode layers 8 and 9 provided on both the corresponding sides of the positive electrode collector foil 10. It is also obvious that wound or flatly wound long cell can demonstrate the same effect.

As described above, a power storage device cell according to Embodiment 1 of the present invention includes a first electrode (capacitor positive electrode) 11a in which a capacitor positive electrode layer 8, which is a first electrode layer including activated-carbon fine particles, is formed on one side of a first collector foil 10a; a second electrode (lithium positive electrode) 11b in which a lithium battery positive electrode 9, which is a second electrode layer including lithium-containing metal compound particles, is formed on one side of a second collector foil 10b; a third electrode 7 in which a third electrode layer 5 or a third electrode layer 6 is (are) formed on at least one side of a third collector foil 3; a first separator 12 formed of a porous insulative film, and a second separator 13 formed of a porous insulative film. In the power storage device cell, a penetration hole 4 is formed in the third collector foil 3; a capacitor whose negative electrode is the third electrode is formed by inserting the first separator 12 between the first electrode layer 8 and the electrode layer 5 of the third electrode 7; a lithium ion battery whose negative electrode common to the capacitor is the third electrode 7 is formed by inserting the second separator 13 between the second electrode layer 9 and the electrode layer 6 of the third electrode 7; the capacitor positive electrode 11a and the lithium battery positive electrode 11b are directly connected; and each of the third electrode layers 5 and 6 is formed of a carbon-based material in which graphite particles and hard carbon particles are mixed, and the proportion of the hard carbon particles in the carbon-based material is from 5% by weight to 70% by weight. As a result, a high-reliability power storage device cell can be obtained which suppresses lithium dendrites formation in the vicinity of the penetration holes when rapid charging and discharging are performed, which has both the instantaneous force and the sustainability, and which can maintain the electrostatic capacitance thereof even when rapid charging and discharging are repeated.

Embodiment 2

Figure 6:
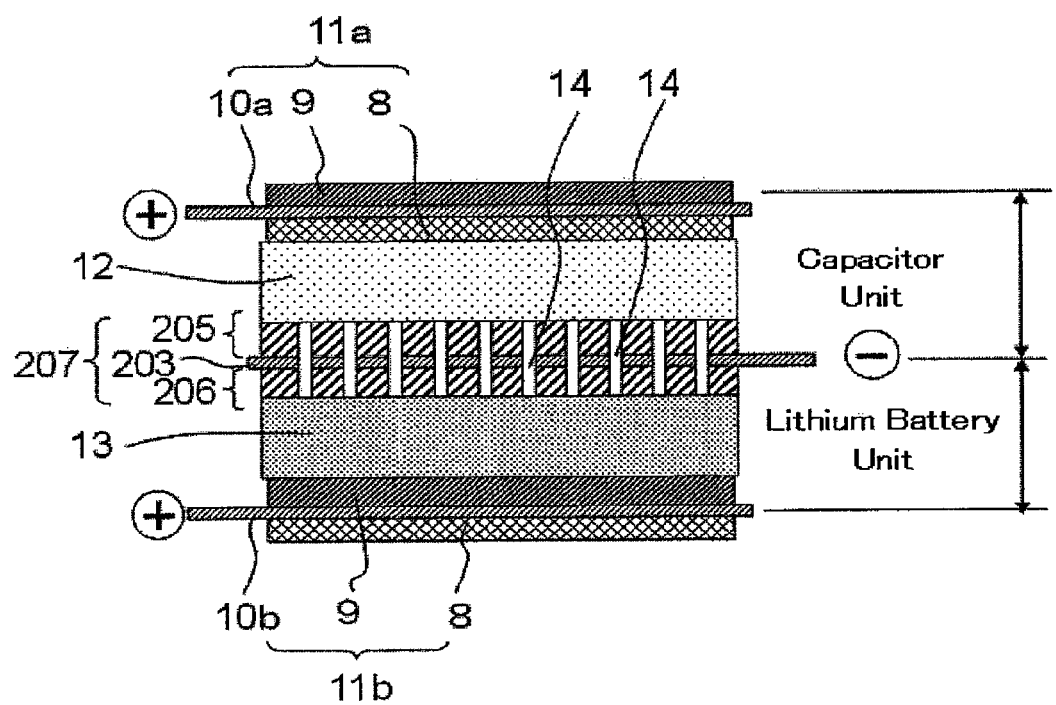
FIG. 6 is a partial cross-sectional view schematically illustrating a power storage device cell according to Embodiment 2 of the present invention.

FIG. 6 is a cross-sectional view schematically illustrating a power storage device cell according to Embodiment 2 of the present invention. The difference between Embodiment 1 and Embodiment 2 lies in that a penetration hole in the collector foil is formed by through-hole that penetrates the common negative electrode. In FIG. 6, in a common negative electrode 207, as the material for a negative electrode collector foil 203, a copper foil was utilized which has no penetration hole formed therein and has a thickness of 10 μm through 20 μm; after a capacitor negative electrode layer 205 and a lithium battery negative electrode layer 206 were formed by coating both sides of the negative electrode collector foil 203 with a paste in which hard carbon particles and graphite particles are mixed, through-holes 14 were formed by making a tool, such as a "kenzan" (a tool that is utilized, in flower arrangement, for fixing flowers and twigs and in which a plurality of needles are arranged upward on a metal pedestal), that has pointed needle-shaped things arranged in the surface thereof physically penetrate the common negative electrode 207 so as to make holes therein. In other words, after a metal foil having no hole was coated with electrode layers, the through-holes 14 were formed by pressing protrusions against the metal foil, and then through-holes, among the through-holes 14, that are in the collector foil 203 were utilized as the penetration holes of the collector foil in Embodiment 1.

The great number of through-holes 14 that penetrate through the common negative electrode 207 in the thickness direction thereof can demonstrate an effect that the electrochemical potential of the common negative electrode 207 is kept constant and hence there can largely be reduced the risk that a local high potential or a local low potential erodes the capacitor positive electrode 11a or the lithium battery positive electrode 11b. Moreover, through the through-hole 14, the electrolyte solution and an ion can rapidly move between the separator 12 and the separator 13 that are situated on the upper side and the lower side, respectively, of the common negative electrode 207; therefore, there can be obtained an effect that in quick response to expansion/contraction of the electrode, the great number of through-holes 14 prevent deterioration caused by rapid charging and discharging. Because the no-hole metal foil can be coated with an electrode layer, the coating can readily be applied to the electrode layer, whereby a uniform electrode layer can be formed.

In FIG. 6, there has been illustrated a case where the electrode layers 205 and 206 are formed on both the corresponding sides of the negative electrode collector foil 203; however, the present invention is not limited thereto. For example, even in the case where only the electrode layer 205 or 206 is formed, the through-hole 14 can be formed after the electrode layer has been formed, whereby the electrolyte solution and an ion can rapidly move between the separator 12 and the separator 13 that are situated on the upper side and the lower side, respectively, of the of the common negative electrode 207.

As described above, the power storage device cell according to Embodiment 2 of the present invention is configured in such a way that in the common negative electrode 207, which is the third electrode, the through-hole 14 is provided which penetrates through the common negative electrode 207 in the thickness direction thereof; therefore, the electrolyte can smoothly move between the capacitor and the lithium battery, whereby the responsiveness to rapid charging and discharging is improved.

Moreover, in the manufacturing method for a power storage device cell according to Embodiment 2 of the present invention, the negative electrode collector foil 203, which is the third collector foil, is coated with a paste for forming the third electrode layers 205 and 206 before the penetration holes are formed in the negative electrode collector foil 203, and then the through-holes 14 are formed by pressing protrusions against the negative electrode collector foil 203; therefore, not only the penetration holes can be provided in the collector foil, but also the coating can satisfactorily be applied to the electrode layers, whereby the quality stabilizes.

Embodiment 3

Figure 7:
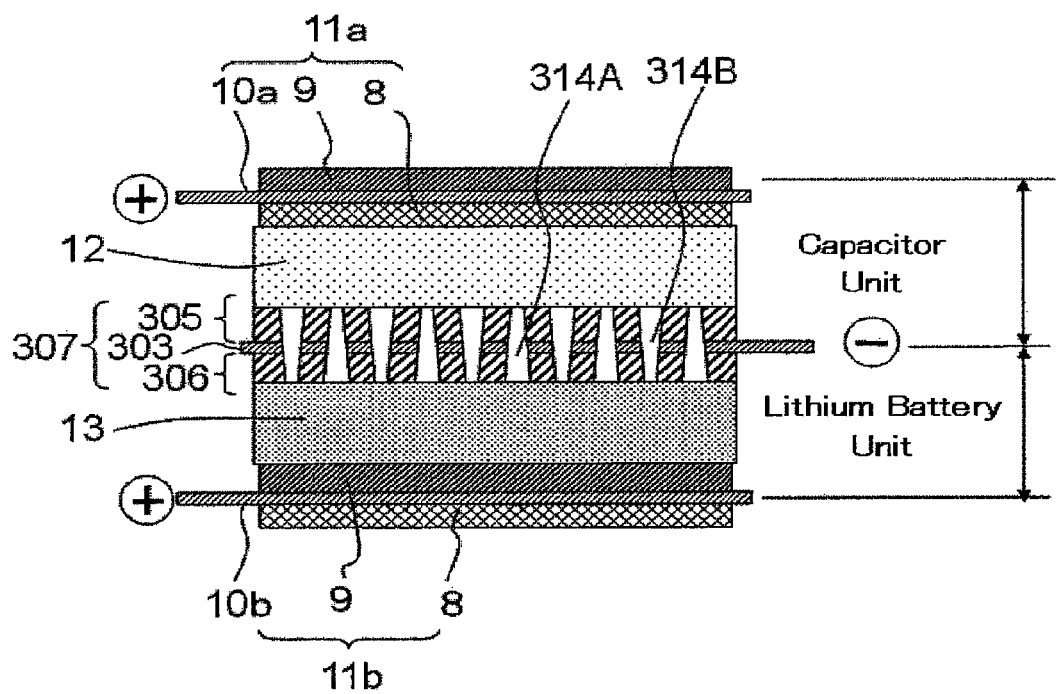
FIG. 7 is a partial cross-sectional view schematically illustrating a power storage device cell according to Embodiment 3 of the present invention.

FIG. 7 is a cross-sectional view schematically illustrating a power storage device cell according to Embodiment 3 of the present invention. As is the case with Embodiment 2, there are provide through-holes that penetrate through the common negative electrode; Embodiment 3 is different from Embodiment 2 in that a through-hole that penetrates through the common negative electrode is cone-shaped, and there are provided two kinds of through-holes (oriented to two directions), i.e., a through-hole 314A that becomes narrower in the direction toward the capacitor negative electrode layer and a through-hole 314B that becomes narrower in the direction toward the lithium battery negative electrode layer. Accordingly, the protrusions are pressed in two directions, i.e., from a capacitor negative electrode layer 305 and from a lithium battery negative electrode layer 306. Specifically, the through-holes of a common negative electrode 307 can be formed through a hole-making method in which a common negative electrode 307, the respective corresponding sides of which are coated with the electrode layers 305 and 306, is disposed between a metal die in which protrusions, each of which is in the form of a quadrangular pyramid, for example, having a base of 0.4 mm and a height of 0.7 mm, are formed in steps of 0.8 mm and a metal plate whose surfaces are smooth, and then pressing processing with a pressure of approximately 0.3 MPa is applied to the upper side and the lower side of the common negative electrode 307 individually. Similarly, a great number of holes can be made by making the upper and lower sides of the common negative electrode 307 pass through a roller having needles individually.

The electrolyte solution can readily pass through the quadrangular-pyramid through-holes 314A and 314B, which are formed from both sides of the common negative electrode 307, selectively in the directions in which the holes become narrower; because the through-hole 314B facilitates the transfer of the electrolyte solution from the first separator to the second separator 13, and the through-hole 314A facilitates the transfer of the electrolyte solution from the second separator 13 to the first separator 12, the concentration of lithium ions becomes uniform; as a result, there can be demonstrated an effect that formation of lithium dendrites in the vicinity of the through-holes in the collector foil 303 is suppressed.

It is preferable that the opening area of the portion, of the collector foil 303, that corresponds to the penetration holes is 1% to 50% by area of the total area of the negative electrode collector foil 303; it is further preferable that the opening area is 5% to 20% by area. In the case where the opening area is from 1% to 50% by area, both the ion conductivity and the electric conductivity can be secured; furthermore, in the case where the opening area is from 5% to 20% by area, not only the balance between the ion conductivity and the electric conductivity becomes satisfactory, but also the strength of the collector foil can sufficiently be kept. Because by changing the opening area, the resistance against ion conduction through the through-holes 314A and 314B changes, the electrochemical-potential difference between the capacitor unit and the lithium battery unit can be controlled; the smaller the opening area is, the larger the electrochemical-potential difference becomes, and hence the electrochemical potential of the lithium battery unit changes slowly.

As described above, a power storage device cell according to Embodiment 3 of the present invention is configured in such a way that the third electrode layers 305 and 306 are provided on both corresponding sides of the third collector foil 303 and the through-holes include a first through-hole 314B that becomes narrower in the direction from the one side on which the electrode layer 305 of the third electrode 307 is provided to the other side thereof on which the electrode layer 306 is provided, and a second through-hole 314A that contrary to the first through-hole 314B, becomes narrower in the direction from the other side on which the electrode layer 306 of the third electrode 307 is provided to the one side thereof on which the electrode layer 305 is provided; therefore, the electrolyte can smoothly move interactive as to move from the capacitor unit to the lithium battery unit and to move from the lithium battery unit to the capacitor unit, whereby the responsiveness to rapid charging and discharging is improved.

Moreover, in the manufacturing method for a power storage device cell according to Embodiment 3 of the present invention, the through-holes 314A and 314B are formed in such a way that both sides of a metal foil are coated with a paste for forming the electrode layers 305 and 306, and then protrusions are pressed against both the respective sides; therefore, the coating can satisfactorily be applied to the electrode layers, where by the quality stabilizes.

In each of Embodiments 2 and 3, the hole, which is formed in the collector foil when a through-hole is made, is adopted as a penetration hole for the electrolyte; however, it goes without saying that even in the case where penetration holes are formed in addition to through-holes, there can be demonstrated an effect that the through-holes make the electrolyte move smoothly.

Embodiment 4

Figure 8:
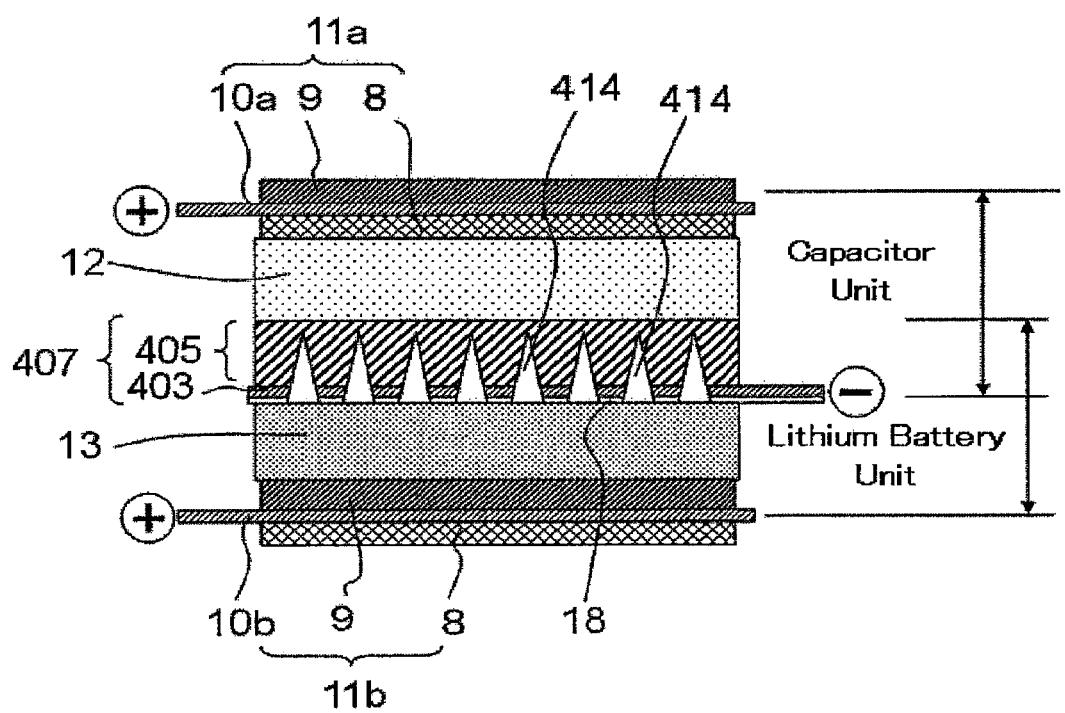
FIG. 8 is a partial cross-sectional view schematically illustrating a power storage device cell according to Embodiment 4 of the present invention.

FIG. 8 is a cross-sectional view schematically illustrating a power storage device cell according to Embodiment 4 of the present invention. Embodiment 4 differs from Embodiment 1 in that in a common negative electrode 407, a capacitor negative electrode layer 405 is formed on one side of a collector foil 403 and an electric insulative layer 18 is formed on the other side, of the collector foil 403, that is situated at the lithium battery unit side. As the electric insulative layer 18 side, a layer is desirable which is coated with a film such as a polyethylene film or a polypropylene film or PVDF. The capacitor negative electrode layer 405 functions also as a lithium battery negative electrode layer 406. A pointed through-hole 414 that penetrates through the common negative electrode 407 including the electric insulative layer is formed in such a way as to start from the electric insulative layer 18 side and becomes narrower in the direction from the electric insulative layer 18 to the capacitor negative electrode layer 405. By making the common negative electrode 407 pass through a roller having needles in such a way that the electric insulative layer 18 faces the needles, a great number of through-holes 414 can be made. It is desirable that an aperture ratio of holes is 30% to 70%; when the aperture ratio of holes is smaller than 30%, the function, as the lithium battery negative electrode layer 406, of the capacitor negative electrode layer 405 is deteriorated. In contrast, when the aperture ratio of holes is larger than 70%, the performance may be deteriorated by the decrease in the area of the negative electrode layer.

Also in the case where the capacitor negative electrode layer 405 functions as the lithium battery negative electrode layer 406, it is important to add hard carbon; formation of lithium dendrites in the vicinity of the through-hole 414, which is a penetration hole of the collector foil 403, can be prevented. Moreover, because the electric insulative layer 18 is provided on the side, of the negative electrode collector foil 403, on which no electrode layer is provided, the portion, out of the metal portion of the collector foil, that does not contribute to the reaction does not make contact with the electrolyte solution; thus, the elution (erosion) of the collector foil can be suppressed.

As described above, in the power storage device cell according to Embodiment 4, the common negative electrode 407 is configured in such a way that the electrode layer 405 is formed at the capacitor unit side of the collector foil 403, that the insulative layer 18 is provided on the side, of the collector foil 403, that is situated in the lithium battery unit, and that the through-hole 414 is provided which penetrates the common negative electrode 407 in the thickness direction thereof and becomes narrower in the direction from the insulative layer 18 to the electrode layer 405; thus, the portion, out of the metal portion of the collector foil, that does not contribute to the reaction does not make contact with the electrolyte solution; thus, the elution (erosion) of the collector foil can be suppressed.

Embodiment 5

Figure 9:
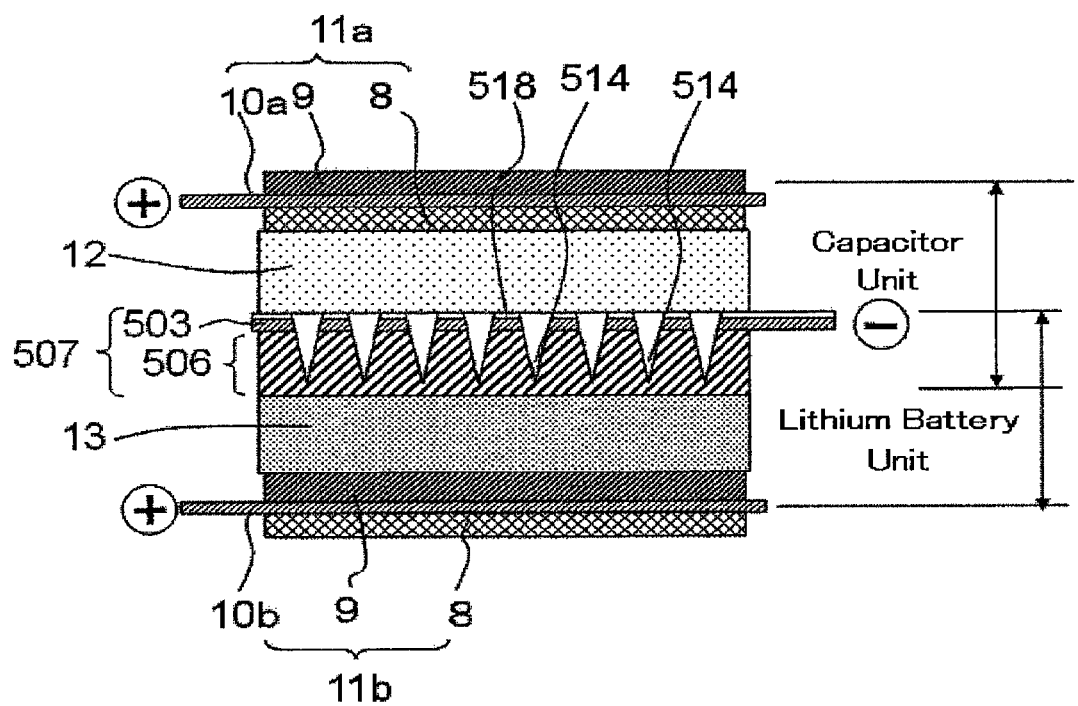
FIG. 9 is a partial cross-sectional view schematically illustrating a power storage device cell according to Embodiment 5 of the present invention.

FIG. 9 is a cross-sectional view schematically illustrating a power storage device cell according to Embodiment 5 of the present invention. Embodiment 5 differs from Embodiment 1 in that in a common negative electrode 507, a lithium battery negative electrode layer 506 is formed on one side of a collector foil 503 and an electric insulative layer 518 is formed on the other side, of the collector foil 503, that is situated at the capacitor unit side. The structure, in the thickness direction, of the common negative electrode 507 is exactly contrary to that of the common negative electrode 407 of Embodiment 4. The lithium battery negative electrode layer 506 functions also as a capacitor negative electrode layer 505.

A pointed through-hole 514 that penetrates through the common negative electrode 507 is formed in such a way as to start from the electric insulative layer 518 side and becomes narrower in the direction from the electric insulative layer 518 to the lithium negative electrode layer 506. By making the common negative electrode 507 pass through a roller having needles in such a way that the electric insulative layer 518 faces the needles, a great number of through-holes 514 can be made. It is desirable that an aperture ratio of holes is 30% to 70%; when the aperture ratio of holes is smaller than 30%, the function, as the lithium battery negative electrode layer 506, of the capacitor negative electrode layer 505 is deteriorated. In contrast, when the aperture ratio of holes is larger than 70%, the performance may be deteriorated by the decrease in the area of the negative electrode layer.

Also in the case where the lithium battery negative electrode layer 506 functions as the capacitor negative electrode layer 505, it is important to add hard carbon; formation of lithium dendrites in the vicinity of the through-hole 514, which is a penetration hole of the collector foil 503 can be prevented. Moreover, because also in Embodiment 5, the electric insulative layer 518 is provided on the side, of the negative electrode collector foil 503, on which no electrode layer is provided, the portion, out of the metal portion of the collector foil, that does not contribute to the reaction does not make contact with the electrolyte solution; thus, the elution (erosion) of the collector foil can be suppressed.

As described above, in the power storage device cell according to Embodiment 5, the common negative electrode 507 is configured in such a way that the electrode layer 506 is formed at the lithium battery unit side of the collector foil 503, that the insulative layer 518 is provided on the side, of the collector foil 503, that is situated in the capacitor unit, and that the through-hole 514 is provided which penetrates the common negative electrode 507 in the thickness direction thereof and becomes narrower in the direction from the insulative layer 518 to the electrode layer 506; thus, the portion, out of the metal portion of the collector foil, that does not contribute to the reaction does not make contact with the electrolyte solution; thus, the elution (erosion) of the collector foil can be suppressed.

Embodiment 6

Figure 10:
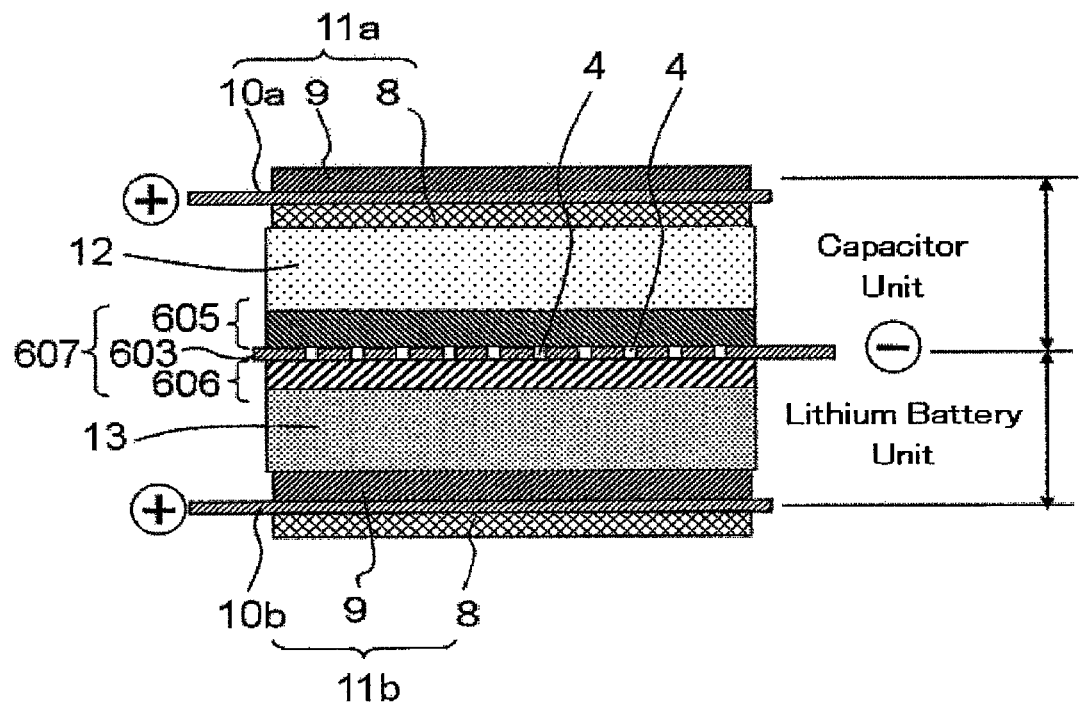
FIG. 10 is a partial cross-sectional view schematically illustrating a power storage device cell according to Embodiment 6 of the present invention.

FIG. 10 is a cross-sectional view schematically illustrating a power storage device cell according to Embodiment 6 of the present invention. Embodiment 6 differs from Embodiment 1 in that the ratio of graphite to hard carbon in an electrode layer 605, of a common negative electrode 607, that is situated at the side of the first separator 12 is different from the ratio of graphite to hard carbon in an electrode layer 606, of the common negative electrode 607, that is situated at the side of the second separator 13; the proportion of hard carbon in the electrode layer 605 at the side of the first separator 12 is higher than the proportion of hard carbon in the electrode layer 606 at the side of the second separator 13. Because the capacitor unit deals with rapid charging and discharging, a large current flows therein. Accordingly, when including more graphite, the electric potential of the capacitor unit becomes lower; thus, the probability that lithium is deposited increases. As explained with reference to FIG. 2, when the electrode layer 605 at the side of the capacitor unit include a great deal of hard carbon, lithium can be inserted at a high electric potential; thus, the electric potential is not liable to drop to the lithium deposition potential, whereby a short circuit arising is suppressed.

Because usage of hard carbon can raise the responsiveness to a large current, usage of a great deal of hard carbon is useful to make a large current instantaneously. In contrast, in comparison with the capacitor unit, a large current is not likely to flow in the lithium battery unit; therefore, even in the case where the proportion of graphite included in the electrode layer 606 is high, the probability that lithium is deposited is low. Moreover, because usage of a great deal of graphite makes it possible to increase the capacitance, the current sustainability can be raised. In this situation, it is desirable that the proportion of the hard carbon in the electrode layer 605 at the first separator 12 is set between more than 1 to 20 times large as the proportion of the hard carbon in the electrode layer 606 at the second separator 13; preferably, between 2 times and 20 times, and more preferably, between 5 times and 20 times. In the case where the ratio of the proportion of the hard carbon in the electrode layer 605 and the proportion of the hard carbon in the electrode layer 606 is the same as or smaller than 1, the lithium battery unit includes more hard carbon than the capacitor unit; thus, the probability that lithium is deposited rises.

Examples of power storage device cell according to Embodiment 6 of the present invention will be described. Prototype cells having different structures of the common negative electrode were manufactured, and then performance tests were carried out. Also in the foregoing performance tests, in order to simplify the test condition, as is the case with the performance tests in Embodiment 1, a positive electrode dedicated to a lithium battery positive electrode and a positive electrode dedicated to a capacitor positive electrode were utilized instead of a hybrid electrode.

Example 7

Manufacturing of Common Negative Electrode

As the negative electrode layers 605, 10 units of hard carbon particles having an average particle diameter of 7 μm and 90 units of graphite particles having an average particle diameter of 5 μm were mixed (the addition amount of the hard carbon is 10% by weight), and then an electrode paste consisting of polyvinylidene fluoride, as a binder, and n-methylpyrrolidone, as a solvent, was mixture-prepared. Next, one side of a copper foil, as the negative electrode collector foil 603, the width and the thickness of which are 300 mm and 20 μm, respectively, and in which holes (penetration holes 4) having a diameter of 1 mm have been punched in steps of 5 mm, was coated with this paste and dried at 100° C.

As the negative electrode layers 606, 5 units of hard carbon particles having an average particle diameter of 7 μm and 95 units of graphite particles having an average particle diameter of 5 μm were mixed (the addition amount of the hard carbon is 5% by weight), and then an electrode paste consisting of polyvinylidene fluoride, as a binder, and n-methylpyrrolidone, as a solvent, was mixture-prepared. Next, the lower side of the negative electrode collector foil 603 on which the negative electrode layer 605 had been formed was coated with this paste and then dried at 100° C.

The negative electrode, both sides of which had been coated, was hot-pressed at 100° C. and adopted as the common negative electrode 607. The negative electrode was cut into a strip of 32 mm by 52 mm; a portion of 20 mm by 20 mm was cut out from the corner thereof; then, a tab of 7 mm by 20 mm was provided so as to be utilized as a current terminal tab.

[Manufacturing of Capacitor Positive Electrode]

As the capacitor positive electrode layer, an electrode paste consisting of activated-carbon having an average particle diameter of 5 μm, carbon black, as a conductive assistant, acrylic-based polymer, as a binder, and water, as a solvent, was mixture-prepared. Next, one side of a pure-aluminum collector foil 10C having a thickness of 50 μm and a width of 300 mm was coated with this paste so that the capacitor positive electrode layer 8 having a thickness of 100 μm was formed; then, a capacitor positive electrode 11C was obtained. The positive electrode 11C was cut into a strip of 30 mm by 50 mm; a portion of 23 mm by 20 mm was cut out from the corner thereof; then, a tab of 7 mm by 20 mm was provided, and then the capacitor positive electrode layer 8 corresponding to the tab was peeled off, so that the foil portion was exposed so as to be utilized as a current terminal tab.

[Manufacturing of Lithium Battery Positive Electrode]

As the lithium battery positive electrode layer, olivine-type lithium iron phosphate having an average particle diameter 5 μm, acetylene black, polyvinylidene fluoride (PVDF), as a binder, being dispersed into n-methylpyrrolidone (NMP); were coated on a pure-aluminum collector foil 10L having a thickness of 50 μm, and dried at 100° C. so as to form the lithium battery positive electrode layer 9 having a thickness of 100 μm; then, the lithium battery positive electrode layer 9 was pressed with a hot roll at 100° C. so that a lithium battery positive electrode 11L was obtained. The positive electrode 11L was cut into a strip of 30 mm by 50 mm; a portion of 23 mm by 20 mm was cut out from the corner thereof; then, a tab of 7 mm by 20 mm was provided, and then the lithium battery positive electrode layer 9 corresponding to the tab was peeled off, so that the foil portion was exposed so as to be utilized as a current terminal tab.

[Manufacturing of Cell]

The capacitor positive electrode 11C (only one side, i.e., only the electrode layer 8 is formed), the common negative electrode 607, and the lithium battery positive electrode 11L (only one side, i.e., only the electrode layer 9 is formed) were laminated in that order in such a way that the centers thereof are aligned with one another and the electrode layers thereof face one another; respective cellulose-based separators having a thickness of 35 μm were inserted between the corresponding electrode layers. The collector tabs of two positive electrodes 110 and 11L were superimposed on each other, and then these collector tabs were directly connected by an aluminum foil ultrasonic-welded thereon, so that a positive electrode collector terminal TP was formed. As illustrated in FIG. 5 explained in Embodiment 1, this electrode laminated body is contained in an aluminum-laminate-film case 19; as the electrolyte solution, a mixed solvent of ethylene carbonate and diethyl carbonate (3:7) including $LiPF_6$ of 1.8 mol/l was put into the package; at last, the aluminum-laminate case 19 was sealed, so that a testing cell was obtained. In the figure, the aluminum-laminate-film case 19 is folded half, and heat fusing with thermoplastic resin is applied to the three sides thereof. Thermoplastic resins 17 having improved adhesiveness to metal are mounted on the current terminals TP and TN and then are heat-fused with the case. Also in this case, through vacuum drawing, the bottom side was impregnated with the electrolyte solution; finally, heat fusing was applied to the bottom side so as to seal it. The reason why the case 19 is made longer than the electrode is that even in the case where when a contact pressure is applied to the electrode of 3 cm by 3 cm and a charging/discharging test is implemented, the electrode generates gas due to deterioration thereof, the generated gas is stored in the elongated case portion so that the test can be continued. In order to prevent a deviation between the positive electrode and the negative electrode from causing a measurement error, the exterior four sides of the negative electrode 7 are longer than the respective four sides of the positive electrodes 11C and 11L.

[Evaluation of Cell]

While by use of a stainless-steel retaining plate, a contact pressure of 5 Kg/cm$^2$ was applied to the electrode of 3 cm by 3 cm in the cell, a charging/discharging test was implemented in which 6-minute charging and 6-minute discharging (10C) were alternatively repeated for 48 hours under the conditions of the ambient temperature of 60° C., the lower limit voltage of 1.5 V, and the upper limit voltage of 4.3 V. Before and after the test, charging and discharging were repeated three times, and then the electrostatic capacitance was determined from the discharging curve of the third charging and discharging. Defining the initial electrostatic capacitance as 100%, the post-testing electrostatic capacitance maintenance rate was determined. After the test, charging up to 4.2 V was implemented and then the voltage maintenance was examined; with regard to a cell whose voltage considerably dropped in a short time, it was determined that due to formation of a lithium dendrite, a minute short circuit existed therein. The reason why the ambient temperature was set not to the room temperature but to 60° C. and the upper limit voltage was raise up to 4.2 V is to accelerate the formation of a lithium dendrite. Moreover, the concentration of lithium salt was raised compared with the normal value (1.2 mol/l) so that an environment was made in which a lithium dendrite forms readily.

Example 8

Example 8 is the same as Example 7 except that the addition amount of the hard carbon for the capacitor negative electrode layer 605 was set to 25% by weight.

Example 9

Example 9 is the same as Example 7 except that the addition amount of the hard carbon for the capacitor negative electrode layer 605 was set to 50% by weight.

Example 10

Example 10 is the same as Example 7 except that the addition amount of the hard carbon for the capacitor negative electrode layer 605 was set to 70% by weight.

Example 11

Example 11 is the same as Example 7 except that the addition amount of the hard carbon for the capacitor negative electrode layer 605 was set to 10% by weight and the addition amount of the hard carbon for the lithium battery negative electrode layer 606 was set to 50% by weight.

The results of evaluations on Examples 7 through 11 are represented in Table 2.

TABLE 2

| | Capacitor Negative Electrode Layer | | Lithium Negative Electrode Layer | | Electrostatic Capacitance | |
|---|---|---|---|---|---|---|
| | Hard Carbon | Graphite | Hard Carbon | Graphite | Maintenance Rate | Short Circuit |
| Example 7 | 10 wt % | 90 wt % | 5 wt % | 95 wt % | 86% | None |
| Example 8 | 25 wt % | 75 wt % | 5 wt % | 95 wt % | 87% | None |
| Example 9 | 50 wt % | 50 wt % | 5 wt % | 95 wt % | 89% | None |
| Example 10 | 70 wt % | 30 wt % | 5 wt % | 95 wt % | 90% | None |
| Example 11 | 10 wt % | 90 wt % | 50 wt % | 50 wt % | 78% | None |

In Table 2, no short circuit arose in each of the cells of Examples 7 through 10. In comparison with Examples 1 through 5 in Table 1, the electrostatic capacitance maintenance rates of Examples 7 through 10 are kept high on the whole; thus, it can be seen that a cell in which hard carbon ratio of the capacitor negative electrode layer is higher than that of the lithium negative electrode layer suppresses more a minute short circuit arising. Because hard carbon ratio of capacitor negative electrode layer is less than that of lithium negative electrode layer, the cell of Example 11 has a little smaller electrostatic capacitance maintenance rate than the other Examples, although it is superior to Comparative Examples 1 through 4; no short circuit arose, but a small sign of short-circuiting appeared.

With regard to foregoing Examples, a case was described in which because of the test utilizing a small cell, the dedicated capacitor positive electrode 11C and lithium battery positive electrode 11L were formed by providing the positive electrode on one side of respective positive electrode collector foils; however, it is obvious that the same effect can be obtained also with a configuration in which as illustrated in FIG. 10, alternate lamination is made through the separators, by use of the hybrid positive electrode 11 including the positive electrode layers 8 and 9 provided on both the corresponding sides of the positive electrode collector foil 10. It is also obvious that wound or flatly wound long cell can demonstrate the same effect.

As described above, in the power storage device cell according to Embodiment 6, the common negative electrode 607 is configured in such a way that the electrode layers 605 and 606 are formed on both respective corresponding sides of the collector foil 603 and that the proportion of the hard carbon included in the electrode layer 605 at the side of the first separator 12 is higher than the proportion of the hard carbon included in the electrode layer 606 at the side of the second separator 13; therefore, a high-reliability power storage device cell can be obtained which suppresses a minute short circuit arising and has a high capacitance maintenance rate.

Embodiment 7

Figure 11:
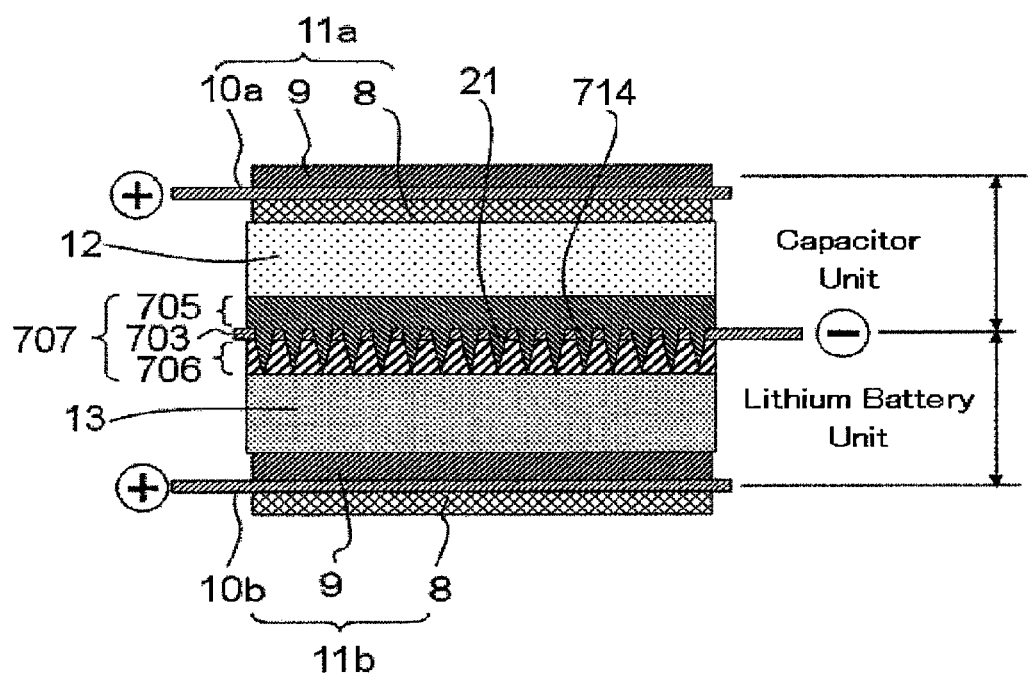
FIG. 11 is a partial cross-sectional view schematically illustrating a power storage device cell according to Embodiment 7 of the present invention.

Because it was found that in the case where in each of Embodiments 2 through 5, a through-hole that penetrates the common negative electrode is provided, depletion of the electrolyte solution in the through-hole causes a decrease in the electrostatic capacitance, Embodiment 7 of the present invention was devised in order to cope with this problem. FIG. 11 is a cross-sectional view schematically illustrating a power storage device cell according to Embodiment 7 of the present invention. In a power storage device cell according to Embodiment 7, the empty space, which is formed when each of the through-holes (14, 314, 414, and 514; in Embodiment 7, the through-hole is indicated by Reference Numeral 714) that penetrate the respective common negative electrodes in Embodiments 2 through 5 are created, was filled with the material of an electrode layer 705 or 706 of a common negative electrode 707. Specifically, after coating was applied to the electrode layer 705 or 706 (706 in FIG. 7) on one side of the common negative electrode 707, the through-hole 714 is formed; then, the residual electrode layer 705 is formed on the other side, and the through-hole 714 is filled with a carbon material 21 that form the electrode layer.

In the case where the through-hole 714 is formed in the common negative electrode 707 and then a penetration hole is formed in a collector foil 703, the hole diameter of the through-hole 714 is larger than the pore diameter in the electrode layer 705 or 706; thus, the liquid retention performance of the electrolyte solution is deteriorated. In the case where the power storage device cell is utilized for a long time, the electrolyte solution may gradually be dissipated. In this situation, at first, the electrolyte solution in the through-hole 714 having a larger hole diameter is dissipated; therefore, the ion paths that connect the upper and lower sides of the common negative electrode 707 decrease and hence the ion transferrence between the upper and lower sides cannot be exist, whereby the performance may be deteriorated. However, by filling the through-hole 714 with a carbon-based porous substance, the liquid retention performance of the electrolyte solution is raised, whereby depletion of the electrolyte solution can be prevented.

Also in this case, as is the case with Embodiment 6, it is desirable that the proportion of hard carbon included in the electrode layer 705, at the side of the first separator 12, of the common negative electrode 707, is higher than the proportion of hard carbon included in the electrode layer 706 at the side of the second separator 13. By forming in the through-hole 714 a carbon-based material the same as the material of one of the electrode layers, depletion of the electrolyte solution can be prevented. Moreover, it is more desirable that the through-hole 714 is filled with the material of the electrode layer 705, at the first separator 12, of the common negative electrode 707, because the proportion of the hard carbon is raised and hence lithium dendrites are readily prevented from forming in the vicinity of the through-hole 714. It is desirable that in the case where the electrode layer 705 is formed in the through-hole 714, the proportion of hard carbon in the electrode layer 705 is set to 10% by weight to 95% by weight and the proportion of hard carbon in the electrode layer 706 is set to 5% by weight to 40% by weight. It was learned that by the through-hole 714 is filled with same material of the electrode layer 705, deposition of lithium dendrites are suppressed even in the case where the proportion of hard carbon is higher and that no problem is posed even in the case where the proportion of hard carbon is 95% by weight.

Examples of power storage device cell according to Embodiment 7 of the present invention will be described. Prototype cells having different structures of the common negative electrode 707 were manufactured, and then performance tests were carried out. Also in the foregoing performance tests, in order to simplify the test condition, as is the case with the performance tests in Embodiments 1 and 6, a positive electrode dedicated to a lithium battery positive electrode and a positive electrode dedicated to a capacitor positive electrode were utilized instead of a hybrid electrode.

Example 12

Manufacturing of Common Negative Electrode

As the negative electrode layers 706, 5 units of hard carbon particles having an average particle diameter of 7 μm and 95 units of graphite particles having an average particle diameter of 5 μm were mixed (the addition amount of the hard carbon is 5% by weight), and then an electrode paste consisting of polyvinylidene fluoride, as a binder, and n-methylpyrrolidone, as a solvent, was mixture-prepared. Next, one side of an electrolytic copper foil, as the negative electrode collector foil 703, having a width of 300 mm and a thickness of 12 μm was coated with this paste and then dried at 100° C. After being pressed at the room temperature, the manufactured one-side-coated negative electrode was disposed between a metal die in which protrusions, each of which is in the form of a quadrangular pyramid, for example, having a base of 0.4 mm and a height of 0.7 mm, are formed in steps of 0.8 mm and a metal plate whose surfaces are smooth, and then pressing processing with a pressure of approximately 0.3 MPa was applied to the negative electrode, so that through-holes were formed.

As the negative electrode layers 705, 10 units of hard carbon particles having an average particle diameter of 7 μm and 90 units of graphite particles having an average particle diameter of 5 μm were mixed (the addition amount of the hard carbon is 10% by weight), and then an electrode paste consisting of polyvinylidene fluoride, as a binder, and n-methylpyrrolidone, as a solvent, was mixture-prepared. After as described above, the negative electrode layer was formed, the surface of the negative electrode collector foil 703 in which the through-holes 714 had been formed was coated with this paste and then dried at 100° C.

The negative electrode, both sides of which had been coated, was hot-pressed at 100° C. and adopted as the common negative electrode 707. The negative electrode was cut into a strip of 32 mm by 52 mm; a portion of 20 mm by 20 mm was cut out from the corner thereof; then, a tab of 7 mm by 20 mm was provided so as to be utilized as a current terminal tab. The cross-section of the through-hole 714 in the cutout was observed, and then it was confirmed that a filling layer 21 of a material the same as that of the negative electrode layer 705 had been formed in the through-hole 714.

[Manufacturing of Capacitor Positive Electrode]

As the capacitor positive electrode layer, an electrode paste consisting of activated-carbon having an average particle diameter of 5 μm, carbon black, as a conductive assistant, acrylic-based polymer, as a binder, and water, as a solvent, was mixture-prepared. Next, one side of a pure-aluminum collector foil 100 having a thickness of 50 μm and a width of 300 mm was coated with this paste so that the capacitor positive electrode layer 8 having a thickness of 100 μm was formed; then, a capacitor positive electrode 11C was obtained. The positive electrode 11C was cut into a strip of 30 mm by 50 mm; a portion of 23 mm by 20 mm was cut out from the corner thereof; then, a tab of 7 mm by 20 mm was provided, and then the capacitor positive electrode layer 8 corresponding to the tab was peeled off, so that the foil portion was exposed so as to be utilized as a current terminal tab.

[Manufacturing of Lithium Battery Positive Electrode]

As the lithium battery positive electrode layer, olivine-type lithium iron phosphate having an average particle diameter 5 μm, acetylene black, polyvinylidene fluoride (PVDF), as a binder, being dispersed into n-methylpyrrolidone (NMP); were coated on a pure-aluminum collector foil 10L having a thickness of 50 μm, and dried at 100° C. so as to form the lithium battery positive electrode layer 9 having a thickness of 100 μm; then, the lithium battery positive electrode layer 9 was pressed with a hot roll at 100° C. so that a lithium battery positive electrode 11L was obtained. The positive electrode 11L was cut into a strip of 30 mm by 50 mm; a portion of 23 mm by 20 mm was cut out from the corner thereof; then, a tab of 7 mm by 20 mm was provided, and then the lithium battery positive electrode layer 9 corresponding to the tab was peeled off, so that the foil portion was exposed so as to be utilized as a current terminal tab.

[Manufacturing of Cell]

The capacitor positive electrode 11C (only one side, i.e., only the electrode layer 8 is formed), the common negative electrode 707, and the lithium battery positive electrode 11L (only one side, i.e., only the electrode layer 9 is formed) were laminated in that order in such a way that the centers thereof are aligned with one another and the electrode layers thereof face one another; respective cellulose-based separators having a thickness of 35 μm were inserted between the corresponding electrode layers. The collector tabs of two positive electrodes 11C and 11L were superimposed on each other, and then these collector tabs were directly connected by an aluminum foil ultrasonic-welded thereon, so that a positive electrode collector terminal TP was formed.

As explained in Embodiments 1 and 6, this electrode laminated body is contained, as illustrated in FIG. 5, in an aluminum-laminate-film case; as the electrolyte solution, a mixed solvent of ethylene carbonate and diethyl carbonate (3:7) including $LiPF_6$ of 1.8 mol/l was put into the package; at last, the aluminum-laminate case 19 was sealed, so that a testing cell was obtained. In the figure, the aluminum-laminate-film case 19 is folded half, and heat fusing 20 with thermoplastic resin is applied to the three sides thereof. Thermoplastic resins 17 having improved adhesiveness to metal are mounted on the current terminals TP and TN and then are heat-fused with the case. Also in this case, through vacuum drawing, the bottom side was impregnated with the electrolyte solution; finally, heat fusing was applied to the bottom side so as to seal it. The reason why the case 19 is made longer than the electrode is that even in the case where when a contact pressure is applied to the electrode of 3 cm by 3 cm and a charging/discharging test is implemented, the electrode generates gas due to deterioration thereof, the generated gas is stored in the elongated case portion so that the test can be continued. In order to prevent a deviation between the positive electrode and the negative electrode from causing a measurement error, the exterior four sides of the negative electrode 7 are longer than the respective four sides of the positive electrodes 11C and 11L.

[Evaluation of Cell]

While by use of a stainless-steel retaining plate, a contact pressure of 5 Kg/cm$^2$ was applied to the electrode of 3 cm by 3 cm in the cell, a charging/discharging test was implemented in which 6-minute charging and 6-minute discharging (10C) were alternatively repeated for 48 hours under the conditions of the ambient temperature of 60° C., the lower limit voltage of 1.5 V, and the upper limit voltage of 4.3 V. Before and after the test, charging and discharging were repeated three times, and then the electrostatic capacitance was determined from the discharging curve of the third charging and discharging. Defining the initial electrostatic capacitance as 100%, the post-testing electrostatic capacitance maintenance rate was determined. After the test, charging up to 4.2 V was implemented and then the voltage maintenance was examined; with regard to a cell whose voltage considerably dropped in a short time, it was determined that due to formation of a lithium dendrite, a minute short circuit existed therein. The reason why the ambient temperature was set not to the room temperature but to 60° C. and the upper limit voltage was raise up to 4.2 V is to accelerate the formation of a lithium dendrite. Moreover, the concentration of lithium salt was raised compared with the normal value (1.2 mol/l) so that an environment was made in which a lithium dendrite forms readily.

Example 13

Example 13 is the same as Example 12 except that the addition amount of the hard carbon for the capacitor negative electrode layer 705 was set to 25% by weight.

Example 14

Example 14 is the same as Example 12 except that the addition amount of the hard carbon for the capacitor negative electrode layer 705 was set to 50% by weight.

Example 15

Example 15 is the same as Example 12 except that the addition amount of the hard carbon for the capacitor negative electrode layer 705 was set to 70% by weight.

Example 16

Example 16 is the same as Example 12 except that the addition amount of the hard carbon for the capacitor negative electrode layer 705 was set to 95% by weight.

Example 17

Example 17 is the same as Example 12 except that the addition amount of the hard carbon for the capacitor negative electrode layer 705 was set to 95% by weight and the addition amount of the hard carbon for the lithium battery negative electrode layer 706 was set to 10% by weight.

Example 18

Example 18 is the same as Example 12 except that the addition amount of the hard carbon for the capacitor negative electrode layer 705 was set to 95% by weight and the addition amount of the hard carbon for the lithium battery negative electrode layer 706 was set to 20% by weight.

Example 19

Example 19 is the same as Example 12 except that the addition amount of the hard carbon for the capacitor negative electrode layer 705 was set to 95% by weight and the addition amount of the hard carbon for the lithium battery negative electrode layer 706 was set to 30% by weight.

Example 20

Example 20 is the same as Example 12 except that the addition amount of the hard carbon for the capacitor negative electrode layer 705 was set to 95% by weight and the addition amount of the hard carbon for the lithium battery negative electrode layer 706 was set to 40% by weight.

Example 21

Example 21 is the same as Example 12 except that the addition amount of the hard carbon for the capacitor negative electrode layer 705 was set to 10% by weight and the addition amount of the hard carbon for the lithium battery negative electrode layer 706 was set to 50% by weight.

The results of evaluations on Examples 11 through 21 are represented in Table 3.

TABLE 3

| | Capacitor Negative Electrode Layer | | Lithium Negative Electrode Layer | | Electrostatic Capacitance | |
|---|---|---|---|---|---|---|
| | Hard Carbon | Graphite | Hard Carbon | Graphite | Maintenance Rate | Short Circuit |
| Example 12 | 10 wt % | 90 wt % | 5 wt % | 95 wt % | 87% | None |
| Example 13 | 25 wt % | 75 wt % | 5 wt % | 95 wt % | 89% | None |
| Example 14 | 50 wt % | 50 wt % | 5 wt % | 95 wt % | 90% | None |
| Example 15 | 70 wt % | 30 wt % | 5 wt % | 95 wt % | 92% | None |
| Example 16 | 95 wt % | 5 wt % | 5 wt % | 95 wt % | 91% | None |
| Example 17 | 95 wt % | 5 wt % | 10 wt % | 90 wt % | 89% | None |
| Example 18 | 95 wt % | 5 wt % | 20 wt % | 80 wt % | 89% | None |
| Example 19 | 95 wt % | 5 wt % | 30 wt % | 70 wt % | 87% | None |
| Example 20 | 95 wt % | 5 wt % | 40 wt % | 60 wt % | 86% | None |
| Example 21 | 10 wt % | 90 wt % | 50 wt % | 50 wt % | 80% | None |

In Table 3, no short circuit arose in each of the cells of Examples 12 through 21. In comparison with Examples 7 through 10 in Table 2, the electrostatic capacitance maintenance rates of Examples 12 through 20 are kept slightly higher than that of Examples 7 through 10 on the whole; thus, it can be seen that a cell in which the capacitor negative electrode layer is formed in the through-hole 714 suppresses more a minute short circuit from arising. It was also learned that by forming in the through-hole 714 the negative electrode layer of a high hard carbon rate, a short circuit can be prevented from arising by deposition of lithium, even in the case of an electrode layer of a higher hard carbon rate. In contrast, because its capacitor negative electrode layer includes less hard carbon than its lithium negative electrode layer, the cell of Example 21 has a little smaller electrostatic capacitance maintenance rate than the other Examples, although it is superior to Comparative Examples 1 through 4 and Example 11; no short circuit arose, but a small sign of short-circuiting appeared.

With regard to foregoing Examples, a case was described in which because of the test utilizing a small cell, the dedicated capacitor positive electrode 11C and lithium battery positive electrode 11L were formed by providing the positive electrode on one side of respective positive electrode collector foils; however, it is obvious that the same effect can be obtained also with a configuration in which as illustrated in FIG. 10, alternate lamination is made through the separators, by use of the hybrid positive electrode 11 including the positive electrode layers 8 and 9 provided on both the corresponding sides of the positive electrode collector foil 10. It is also obvious that wound or flatly wound long cell can demonstrate the same effect.

In Embodiment 7, a case has been explained in which in order not to raise the complexity of the manufacturing process, the through-hole 714 is filled with a material of the electrode layer that is put on the side in which the through-hole 714 is punched; however, the present invention is not limited thereto. Not limited to the material of the electrode layer, for example, insulative powder can also demonstrate the effect of preventing depletion of the electrolyte in the through-hole 714. Furthermore, the through-holes 714 that correspond to the collector foil 703 may be filled with finer particles than particles utilized for the electrode layer 705 or 706 so that there can be realized a smaller pore diameter than the pore diameter that is realized among particles in the electrode layer 705 or 706.

As described above, it was found that depletion of the electrolyte solution in the through-hole causes a decrease in the electrostatic capacitance, and hence, as the countermeasures therefor, the power storage device cell according to Embodiment 7 was configured in such a way that the through-hole 714 is filled with the particle material 21; therefore, a high-reliability power storage device cell can be obtained which prevents depletion of the electrolyte solution and maintains the electrostatic capacitance.

In particular, the particle material 21 is a material for forming the electrode layer on one side of the common negative electrode 707; therefore, a high-reliability power storage device cell can be obtained which maintains the electrostatic capacitance without raising the complexity of the manufacturing process.

Furthermore, the particle material 21 is a material for forming the capacitor electrode layer 705, in the common negative electrode 707, that has a high hard carbon rate; therefore, by forming the negative electrode layer of a high hard carbon rate in the through-hole 714, a short circuit caused by deposition of lithium can further be suppressed.

DESCRIPTION OF REFERENCE NUMERALS

1: hard carbon particle
2: graphite particle
3: negative electrode collector foil (third collector foil)
4: penetration hole in negative electrode collector foil
5: capacitor negative electrode layer (third electrode layer)
6: lithium battery negative electrode layer (third electrode layer)
7: common negative electrode (third electrode)
8: capacitor positive electrode layer (first electrode layer)
9: lithium battery positive electrode layer (first electrode layer)
10: positive electrode collector foil (10a: first collector foil, 10b: second collector foil)
11: positive electrode (11a: hybrid positive electrode (dealt with as capacitor positive electrode), 11b: hybrid positive electrode (dealt with as lithium battery positive electrode), 11c: capacitor positive electrode, 11L: lithium battery positive electrode
12: first separator
13: second separator
14: through-hole in common negative electrode
18: electric insulative layer
19: case
20: heat-fused portion
21: (porous) filling material in through-hole
Three-digit numbers each denote variant examples in Embodiments.

The invention claimed is:
1. A power storage device cell comprising:
a first electrode in which a first electrode layer including activated-carbon fine particles is formed on one side of a first collector foil;

a second electrode in which a second electrode layer including lithium-containing metal compound particles is formed on one side of a second collector foil;

a third electrode in which a third electrode layer is formed on at least one side of a third collector foil;

a first separator formed of a porous insulative film; and a second separator formed of a porous insulative film, wherein penetration holes are formed in the third collector foil;

a capacitor whose negative electrode is the third electrode is formed by inserting the first separator between the first electrode layer and one side of the third electrode;

a lithium ion battery whose negative electrode common to the capacitor is the third electrode is formed by inserting the second separator between the second electrode layer and the other side of the third electrode;

the first electrode and the second electrode are directly connected;

the third electrode layer is formed of a carbon-based material in which graphite particles and hard carbon particles are mixed, and the proportion of the hard carbon particles in the carbon-based material is from 5% by weight to 70% by weight; and portions of the third electrode layer are provided on both sides of the third collector foil, and the proportion of hard carbon particles included in the third electrode layer at the side of the first separator is higher than the proportion of hard carbon particles included in the third electrode layer at the side of the second separator.

2. The power storage device cell according to claim 1, wherein the lithium-containing metal compound in the second electrode layer is olivine-type lithium iron phosphate.

3. The power storage device cell according to claim 1, wherein in the third electrode, through-holes are provided that penetrate the third electrode in the thickness direction thereof.

4. The power storage device cell according to claim 3, wherein the through-holes include a first through-hole that becomes narrower in the direction from one side of the third electrode to the other side thereof and a second through-hole that becomes narrower in the direction from the other side of the third electrode to the one side thereof.

5. The power storage device cell according to claim 3, wherein each said through-hole is filled with a particle material.

6. The power storage device cell according to claim 5, wherein the particle material is a material for forming an electrode layer on one side of the third electrode.

7. The power storage device cell according to claim 6, wherein the particle material is a material for forming an electrode layer, of the third electrode, that is situated at the first separator.

8. A manufacturing method for the power storage device cell according to claim 3, comprising:

forming the first electrode having the first electrode layer, by coating the first collector foil with a paste in which a binder is added to activated-carbon fine particles;

forming the second electrode having the second electrode layer, by coating the second collector foil with a paste in which a conductive assistant and a binder are added to a lithium-containing metal compound;

forming the third electrode having the third electrode layer, by coating the third collector foil with a paste in which a binder is added to a carbon-based material; and assembling the power storage device cell by laminating the first electrode, the first separator, the third electrode, the second separator, and the second electrode in that order, wherein in the third electrode, before the penetrating through-holes are formed in the third collector foil, a paste is applied to the third collector foil, and then protrusions are pressed against the third collector foil so as to form the penetrating through-holes.

9. A manufacturing method for the power storage device cell according to claim 5, comprising:

forming the first electrode having the first electrode layer, by coating the first collector foil with a paste in which a conductive assistant and a binder are added to activated-carbon fine particles;

forming the second electrode having the second electrode layer, by coating the second collector foil with a paste in which a conductive assistant and a binder are added to a lithium-containing metal compound;

forming the third electrode having the third electrode layer, by coating the third collector foil with a paste in which a binder is added to a carbon-based material; and assembling the power storage device cell by laminating the first electrode, the first separator, the third electrode, the second separator, and the second electrode in that order, wherein in the third electrode, before the penetration holes are formed in the third collector foil, a paste is applied to one side of the third collector foil and the third collector foil is dried, protrusions are pressed against the third collector foil in the direction starting from the other side thereof so as to form the penetrating through-holes, the other side in which the penetrating through-holes are formed is coated with a paste and dried, and then the penetrating through-holes are filled with the particle material.

10. An electric storage device, wherein each of the first electrode and the second electrode is a hybrid electrode in which the first electrode layer is formed on one side of a collector foil and the second electrode layer is formed on the other side thereof; and there is included a laminated body having a main laminate unit in which a plurality of the power storage device cells according to claim 1 are laminated such that the third electrode, the first separator, the hybrid electrode, and the second separator are repeatedly laminated in that order.

11. The electric storage device according to claim 10, wherein the lamination is implemented in such a way that both end portions of the laminated body are the third electrodes.

12. An electric storage device, wherein each of the first electrode and the second electrode is a hybrid electrode in which the first electrode layer is formed on one side of a collector foil and the second electrode layer is formed on the other side thereof; and the power storage device cell according to claim 1 is configured such that the third electrode, the first separator, the hybrid electrode, and the second separator are laminated in that order and then the laminated unit is wound.

* * * * *